United States Patent [19]
Myers et al.

[11] Patent Number: 5,581,713
[45] Date of Patent: Dec. 3, 1996

[54] MULTIPROCESSOR COMPUTER BACKPLANE BUS IN WHICH BUS TRANSACTIONS ARE CLASSIFIED INTO DIFFERENT CLASSES FOR ARBITRATION

[75] Inventors: Mark Myers, Portland; Stacey Lloyd, Hillsboro; Richard Stout, Tualatin; Robert Takasumi, Hillsboro; John Lynch, Portland, all of Oreg.

[73] Assignee: Pyramid Technology Corporation, San Jose, Calif.

[21] Appl. No.: 559,043

[22] Filed: Nov. 15, 1995

Related U.S. Application Data

[62] Division of Ser. No. 328,896, Oct. 25, 1994.

[51] Int. Cl.⁶ .................................................. G06F 13/36
[52] U.S. Cl. ..................... 395/299; 395/730; 395/729; 395/293; 395/728
[58] Field of Search ............................. 395/732, 728, 395/729, 293, 301, 650, 180, 293, 730, 309, 299, 200.08; 370/85.2, 85.6; 340/825.5, 825.51

[56] References Cited

U.S. PATENT DOCUMENTS

| | | | |
|---|---|---|---|
| 5,038,274 | 8/1991 | Nielsen | 395/301 |
| 5,129,089 | 7/1992 | Nielsen | 395/726 |
| 5,148,545 | 9/1992 | Herbst et al. | 395/728 |
| 5,210,871 | 5/1993 | Lala et al. | 395/650 |
| 5,249,297 | 9/1993 | Brockmann et al. | 395/285 |
| 5,287,477 | 2/1994 | Johnson et al. | 395/484 |
| 5,313,591 | 5/1994 | Averill | 395/299 |
| 5,313,641 | 5/1994 | Simcoe et al. | 395/730 |
| 5,333,296 | 7/1994 | Bouchard et al. | 395/497.02 |
| 5,440,698 | 8/1995 | Sindhu et al. | 395/200.08 |
| 5,459,840 | 10/1995 | Isfeld et al. | 395/309 |
| 5,487,170 | 1/1996 | Bass et al. | 395/732 |
| 5,519,838 | 5/1996 | Ziegler et al. | 395/299 |

*Primary Examiner*—Gopal C. Ray
*Attorney, Agent, or Firm*—Burns, Doane, Swecker & Mathis, LLP

[57] ABSTRACT

A computer having multiple modules connected by a backplane bus includes multiple competition signal lines and multiple class signal lines. Access to the backplane bus to engage in one or more of multiple types of bus transactions is arbitrated between the modules by classifying the bus transactions into different classes and, during each of a succession of competition cycles, when a module wants access to the backplane bus to engage in a particular type of bus transaction, asserting a class signal line corresponding to a class in which the particular type of bus transaction has been classified. Based on information presented on the class signal lines, it is determined which modules are or are not eligible to compete for access to the backplane bus. When a module is eligible to compete for access to the backplane bus, it drives an identification code associated with the module on the competition signal lines. Then, based on information presented on the competition signal lines, a module is granted access to the backplane bus.

13 Claims, 15 Drawing Sheets

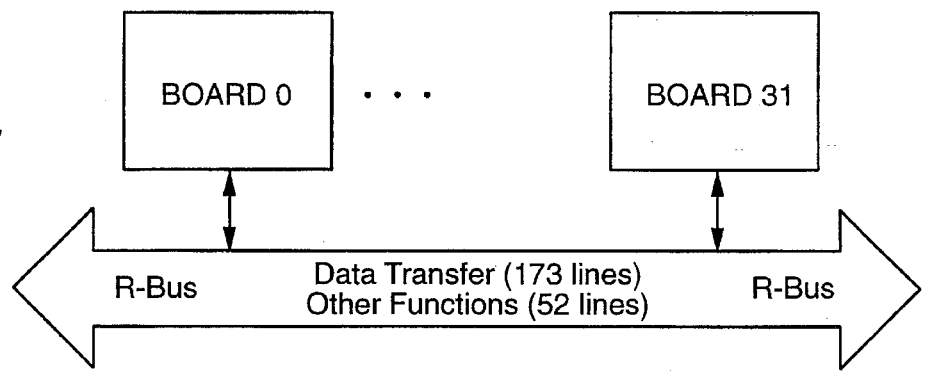
FIG._1
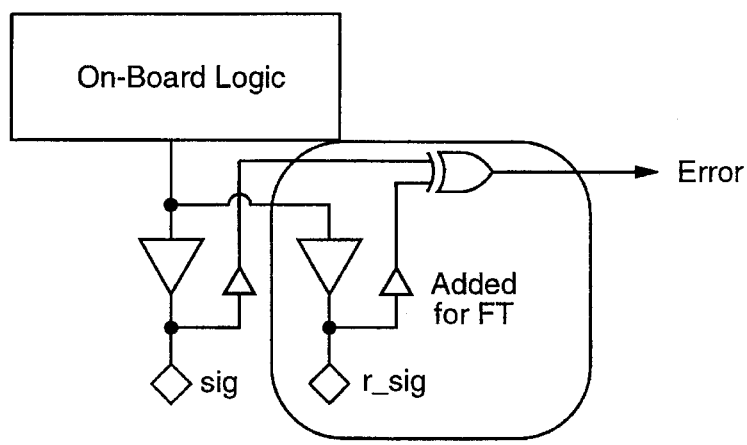
FIG._2
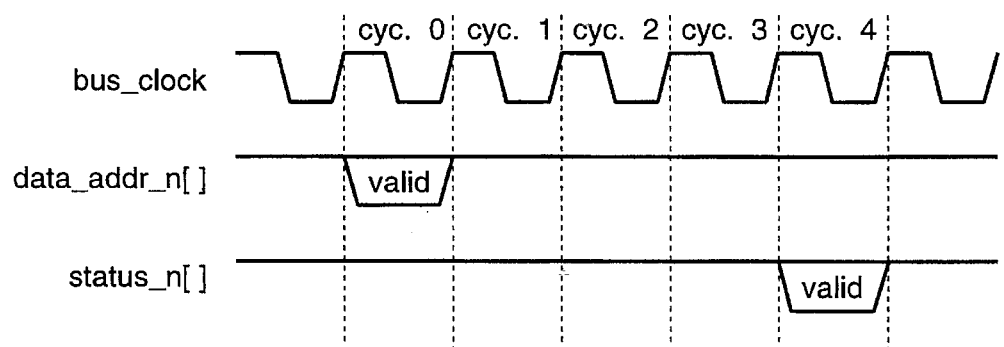
FIG._4

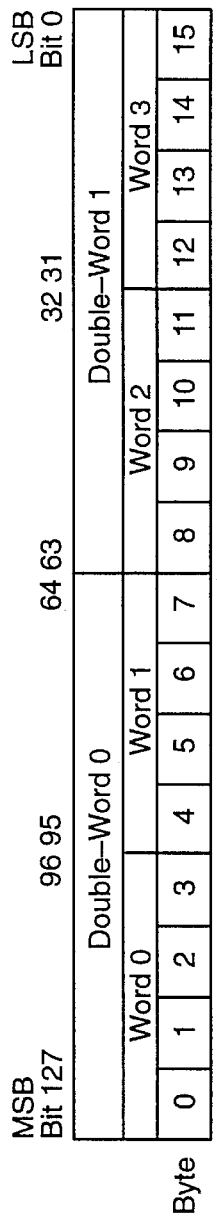
FIG._3
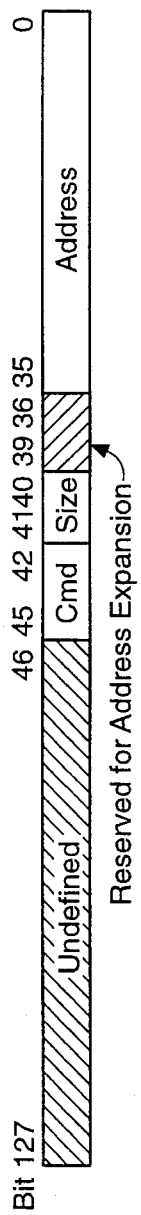
FIG._5
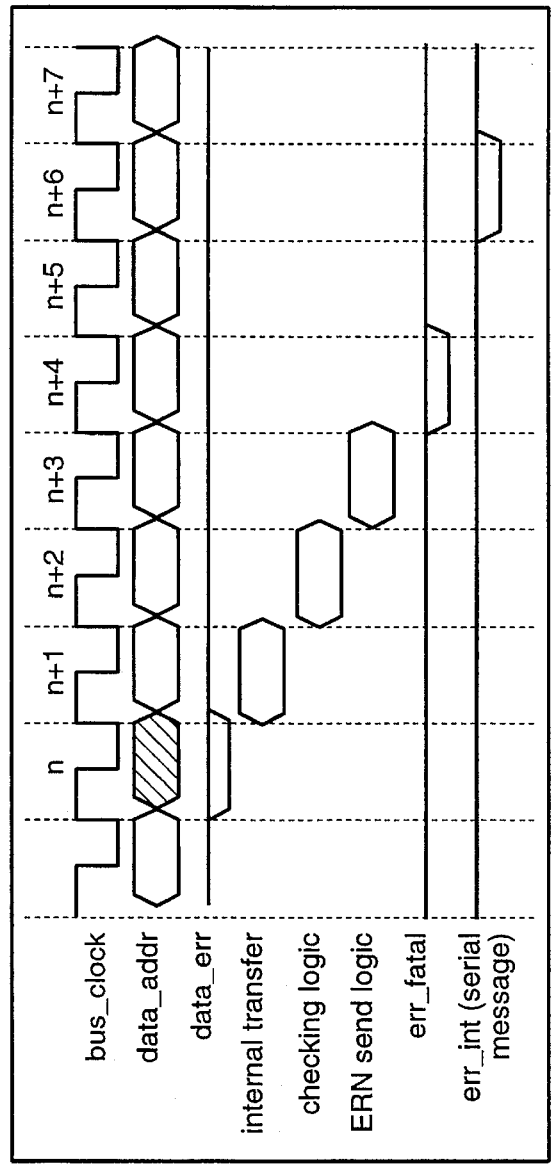
FIG._7

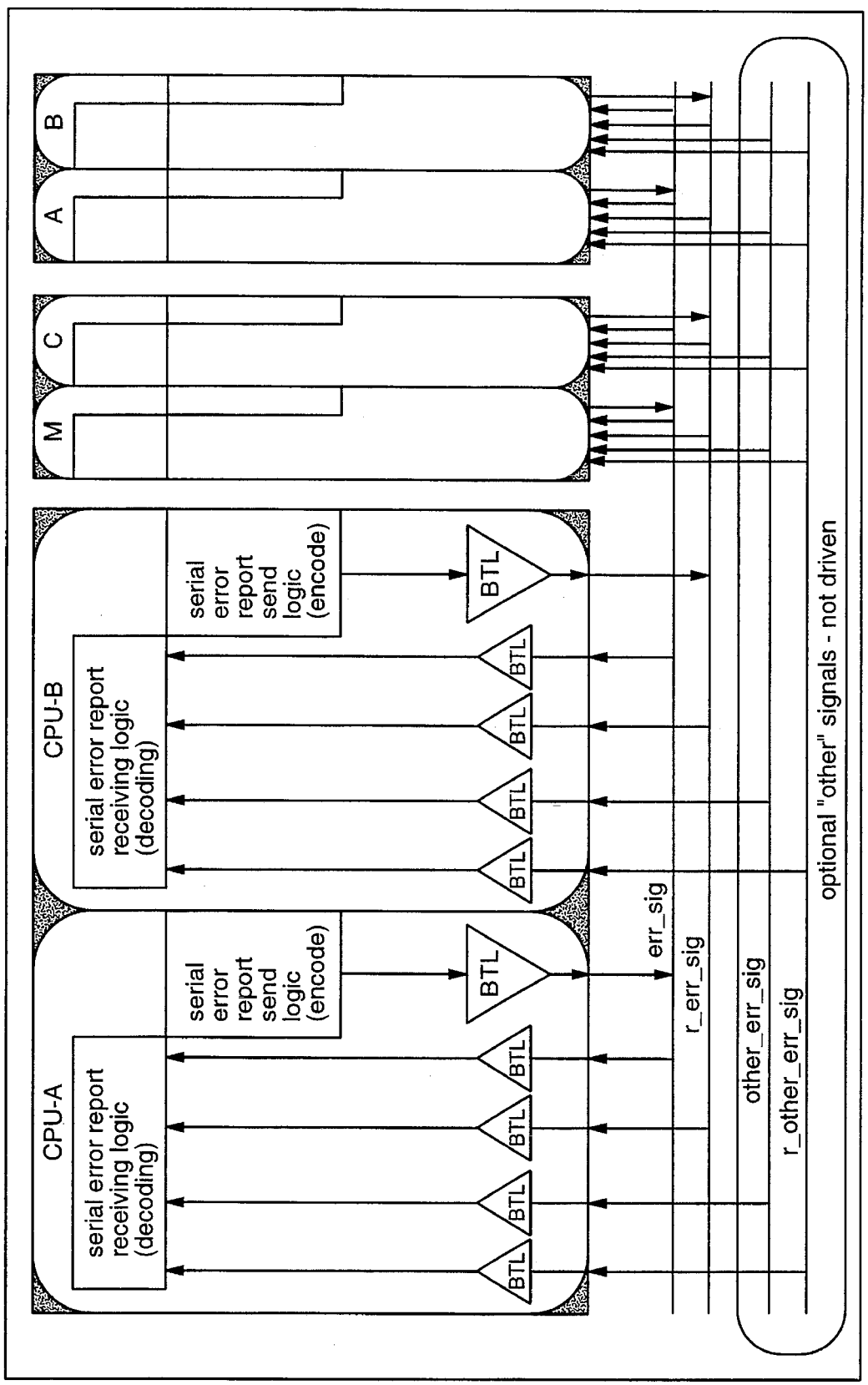
FIG._6

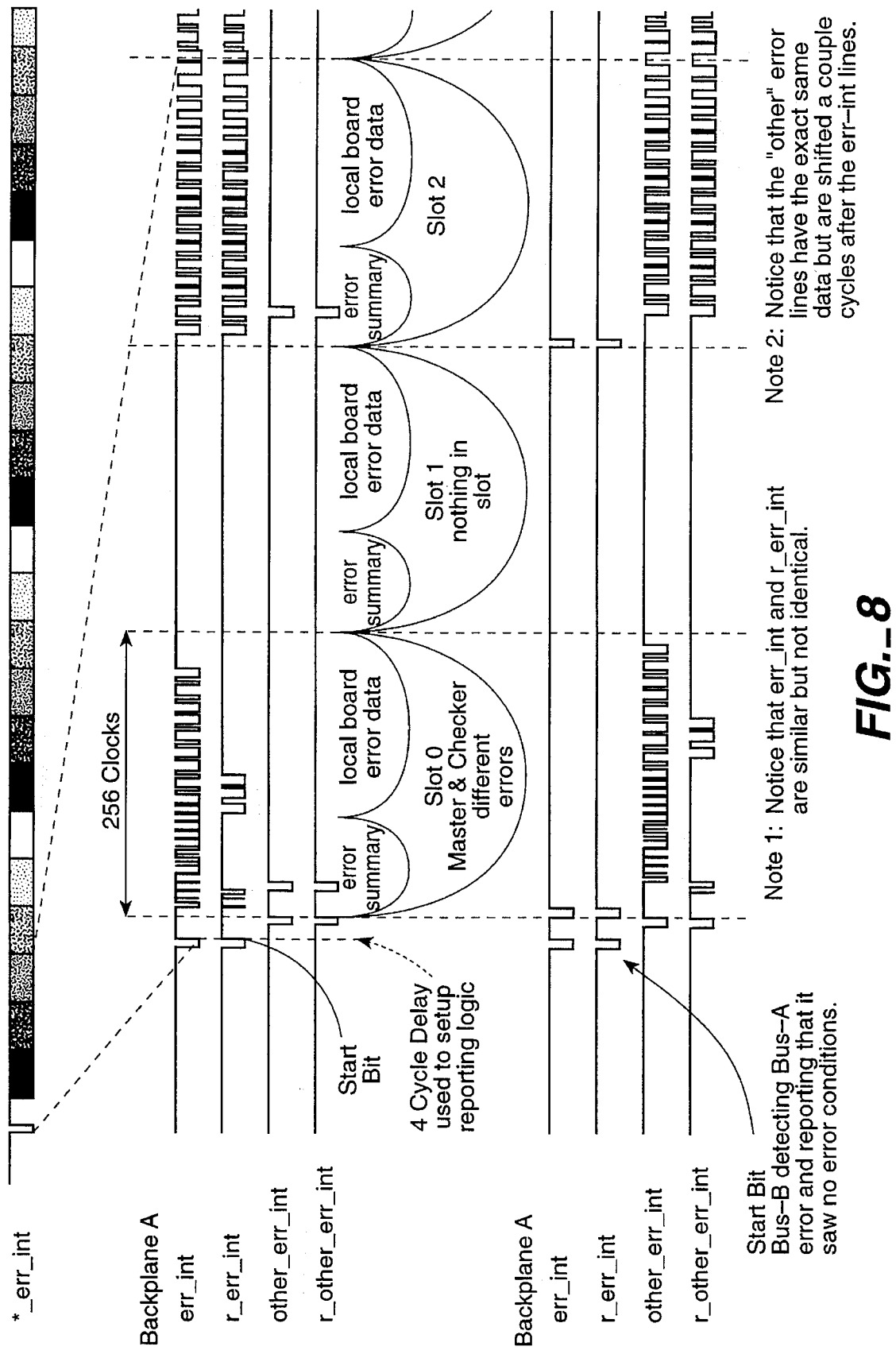

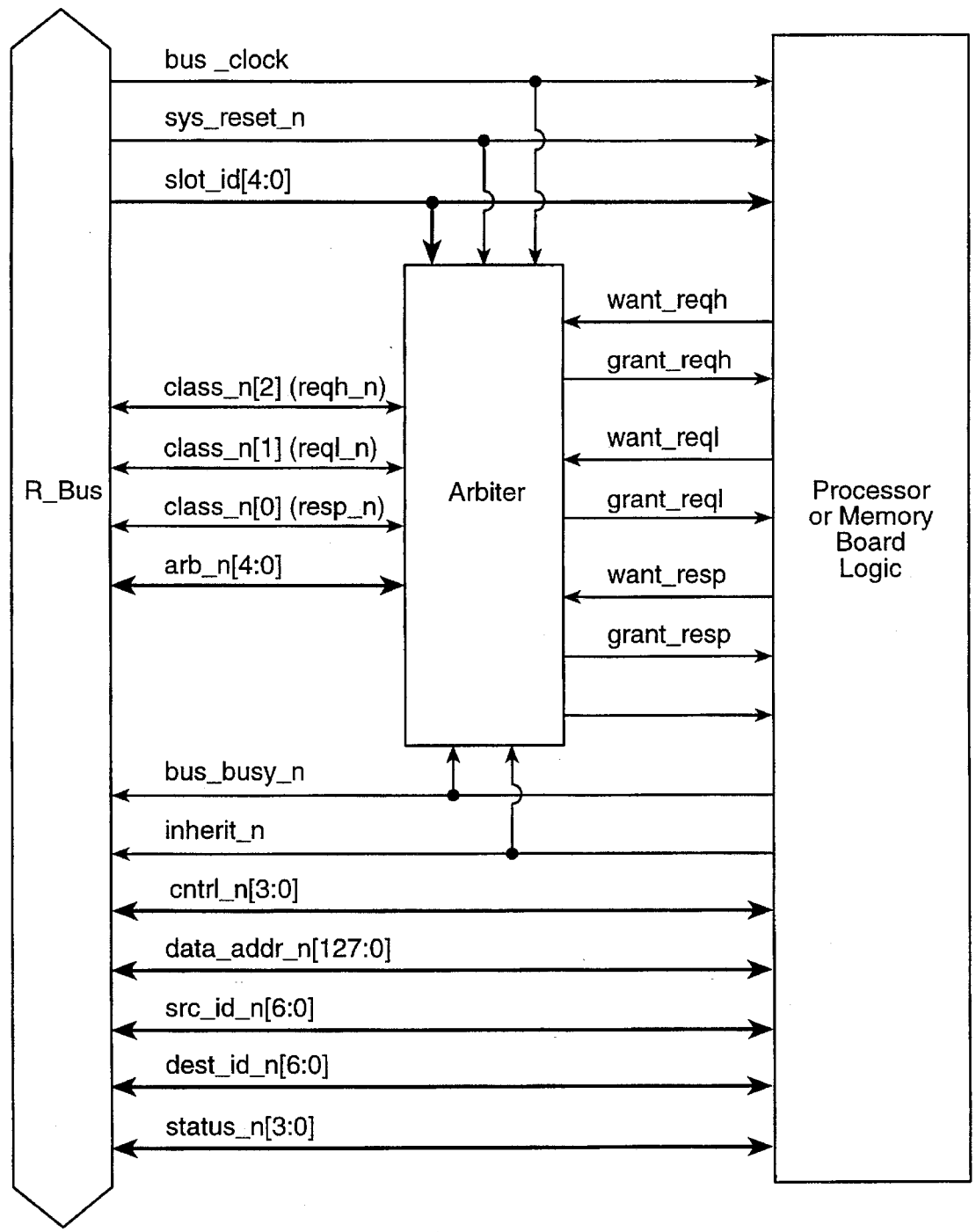
FIG._9

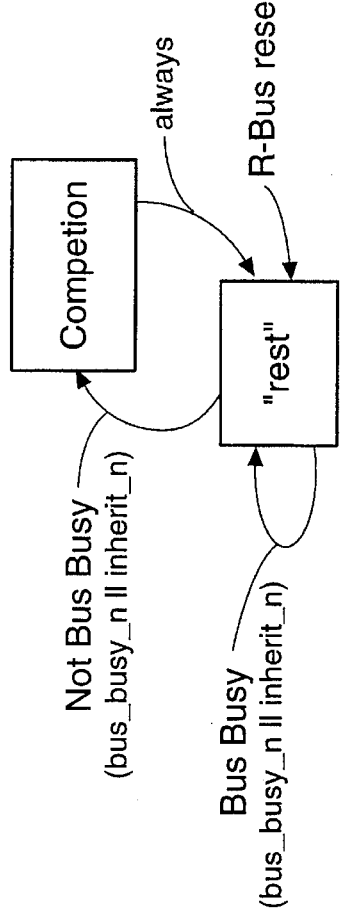
FIG._10
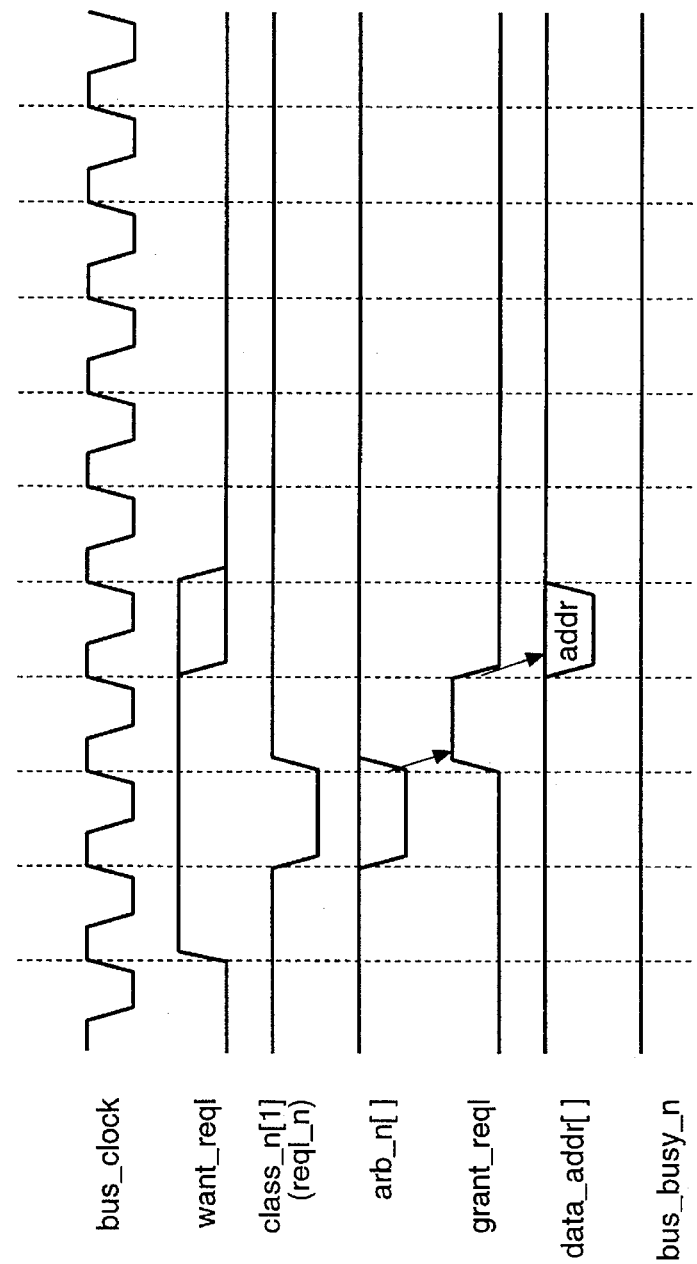
FIG._11

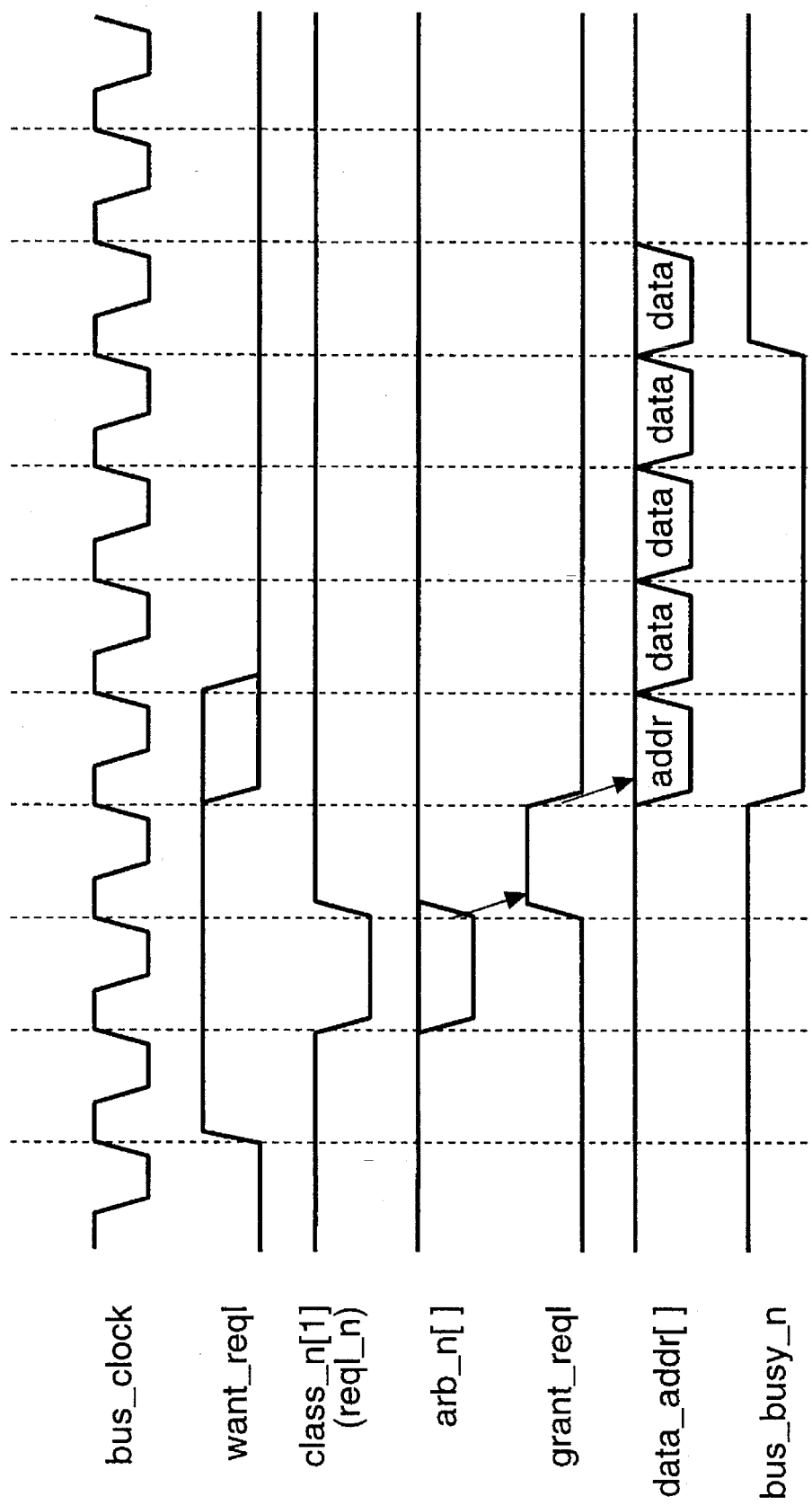
FIG._12

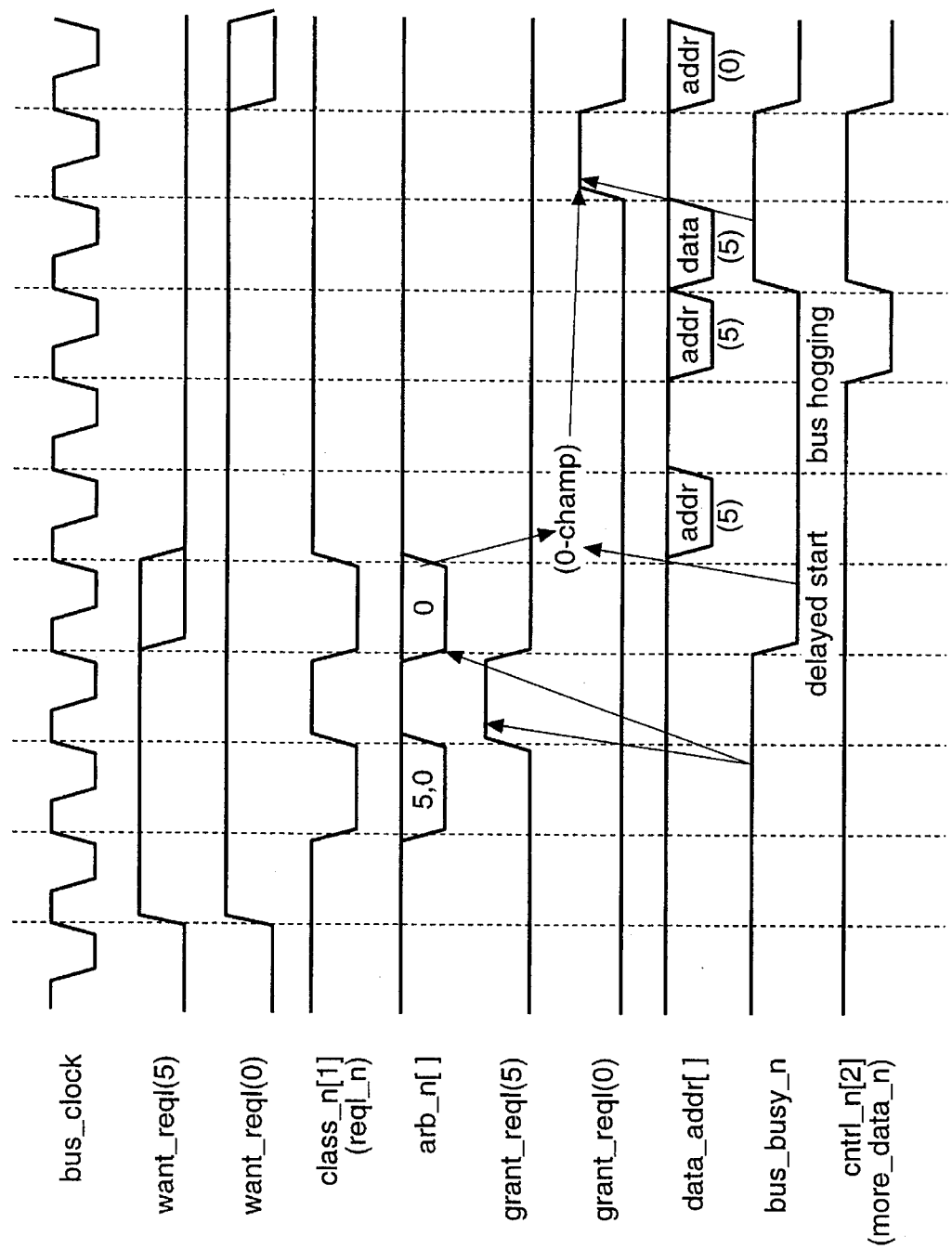
FIG._13

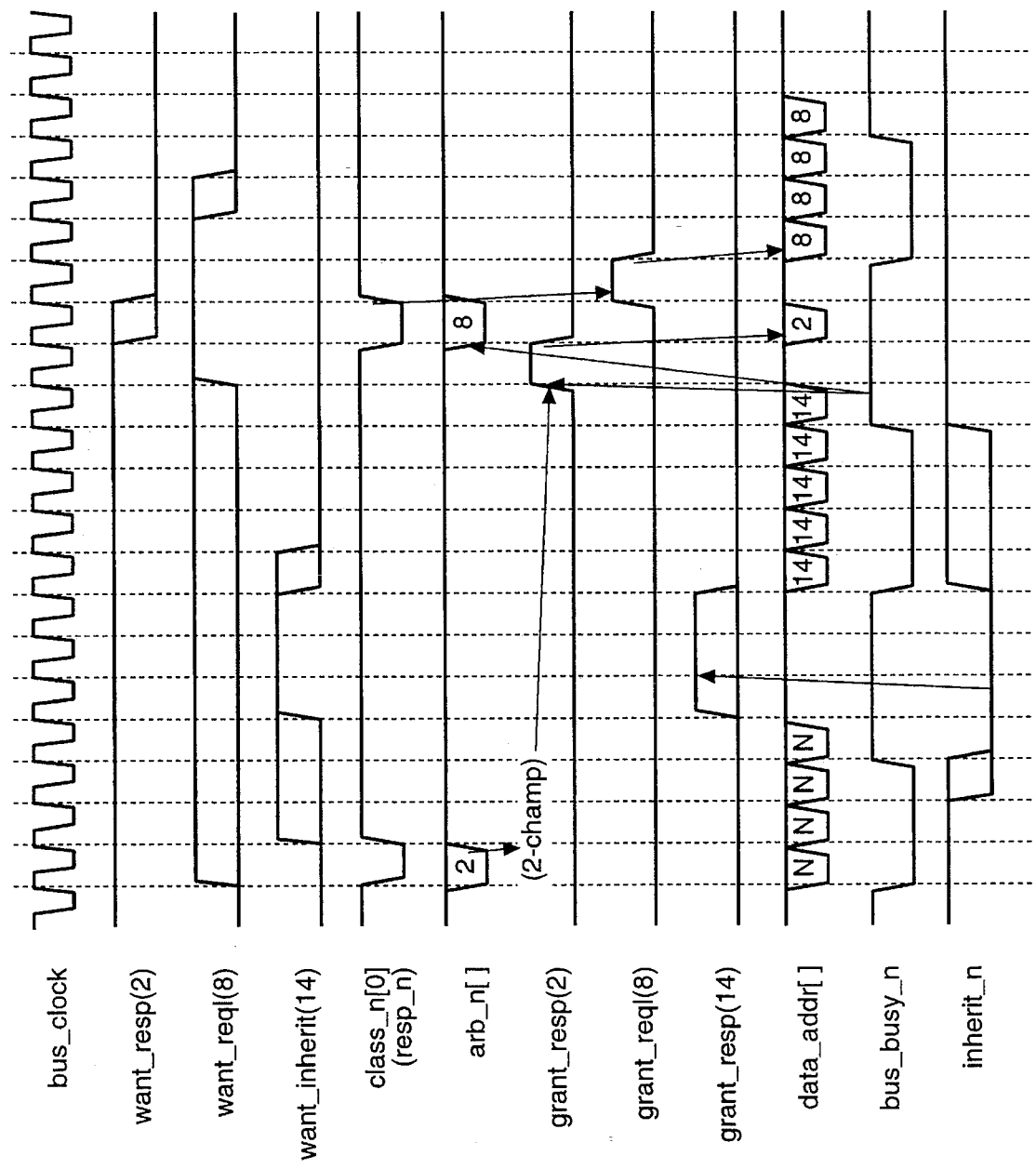
FIG._14

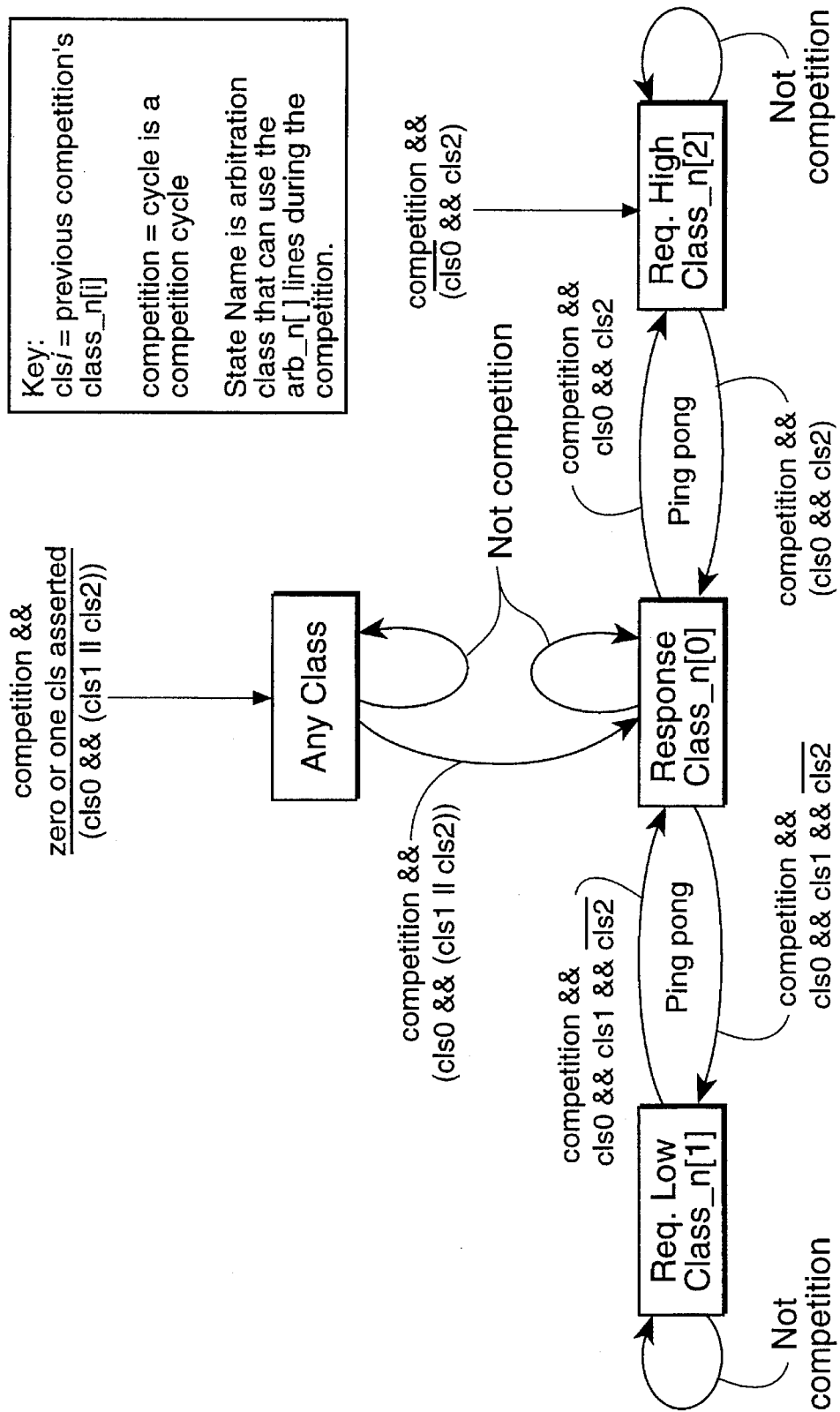
FIG._15

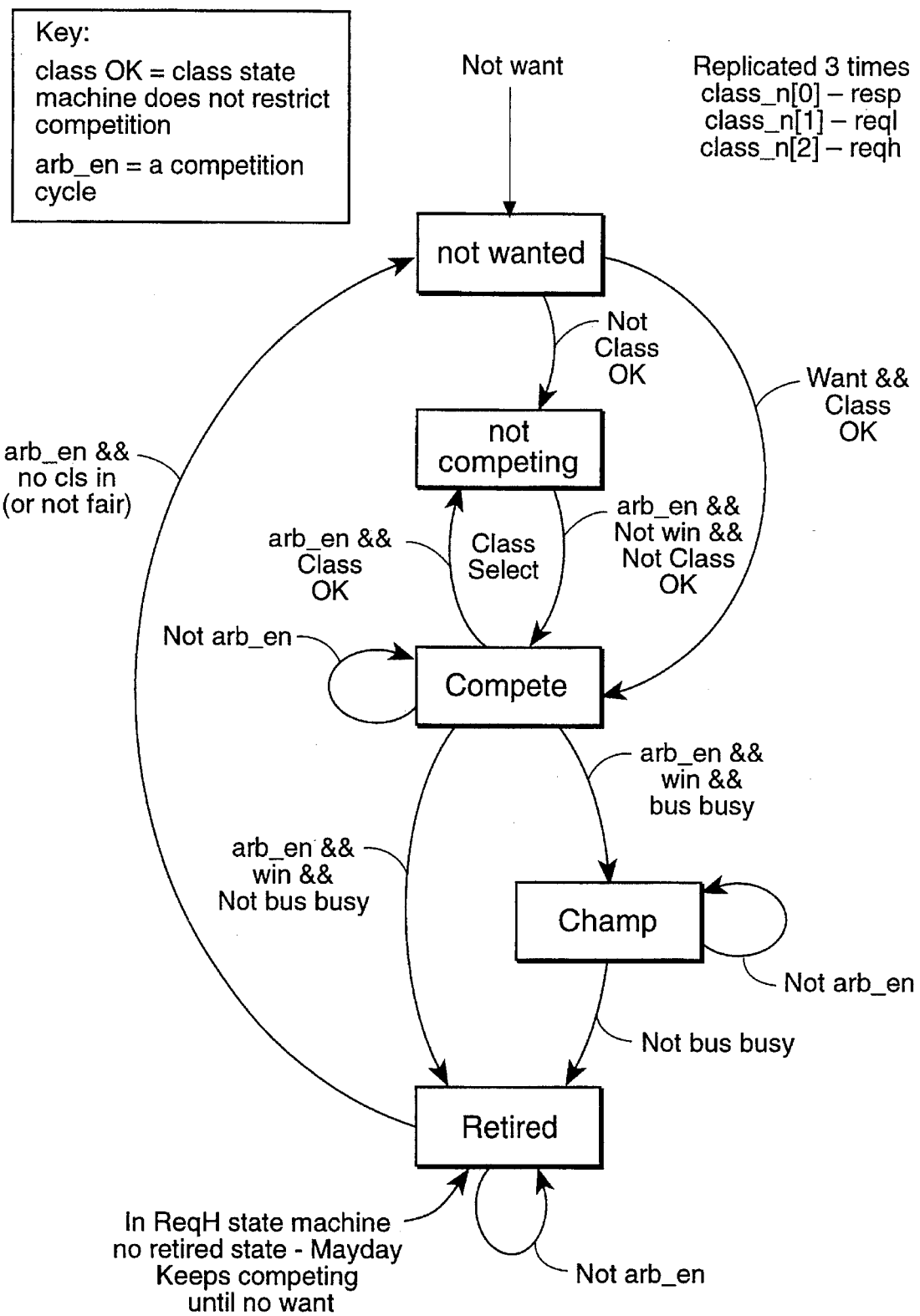
FIG._16

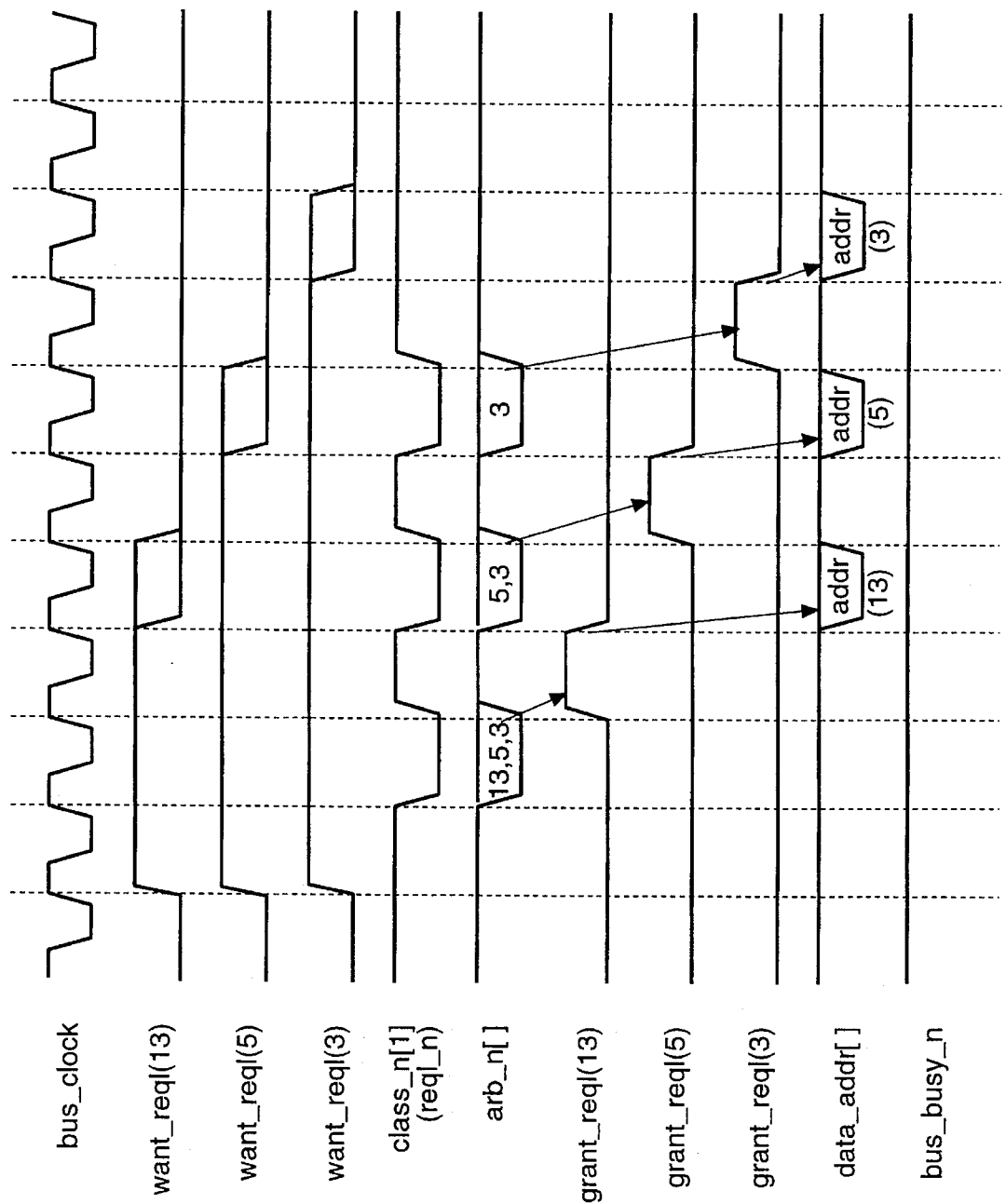
FIG._17

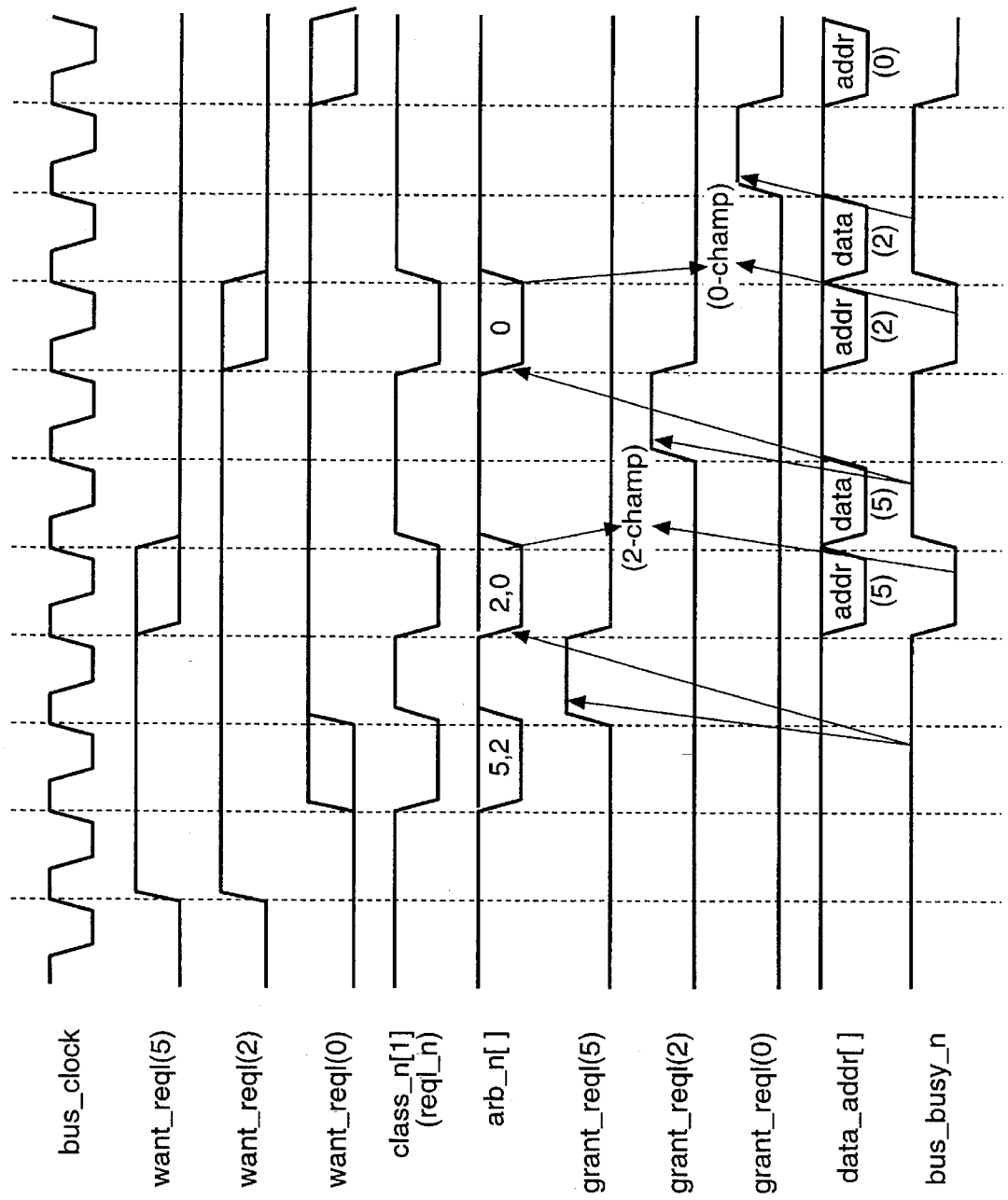
FIG._18

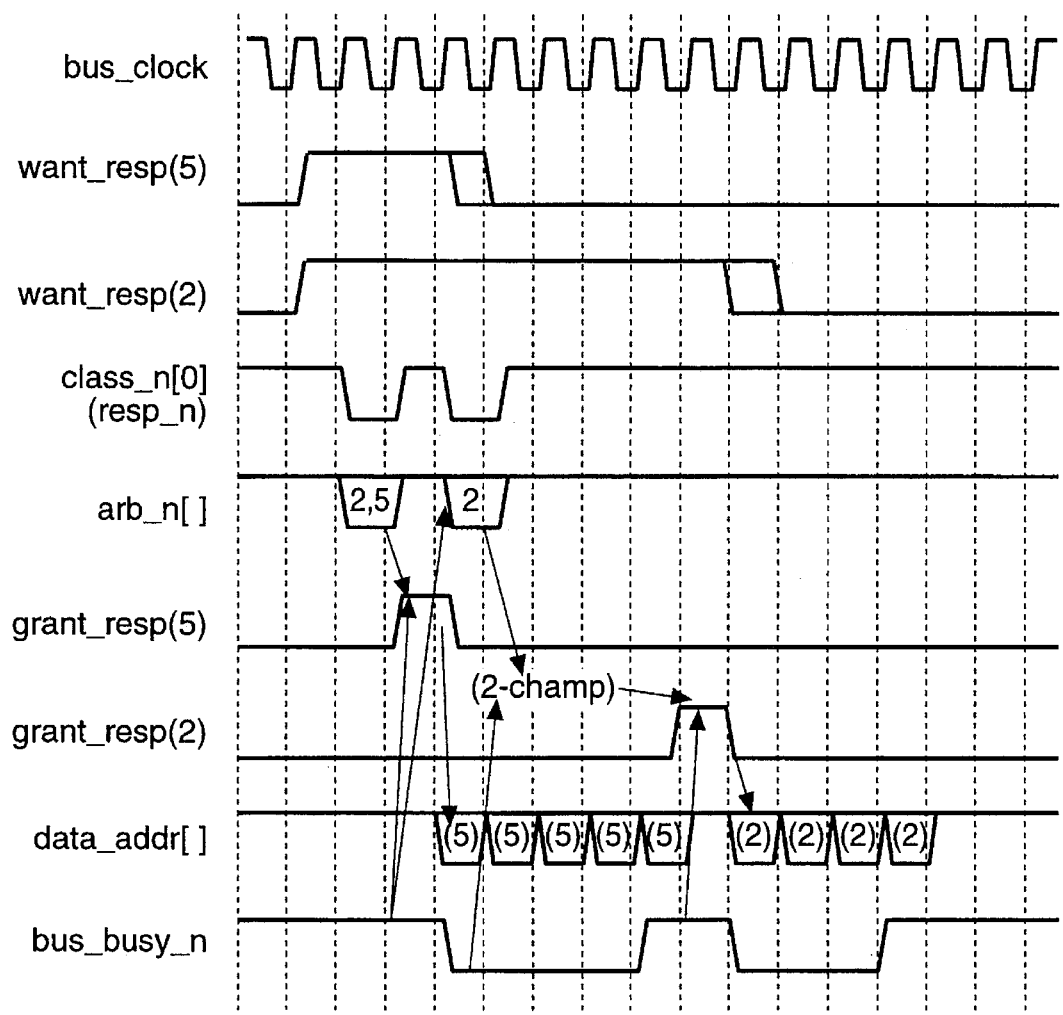
FIG._19

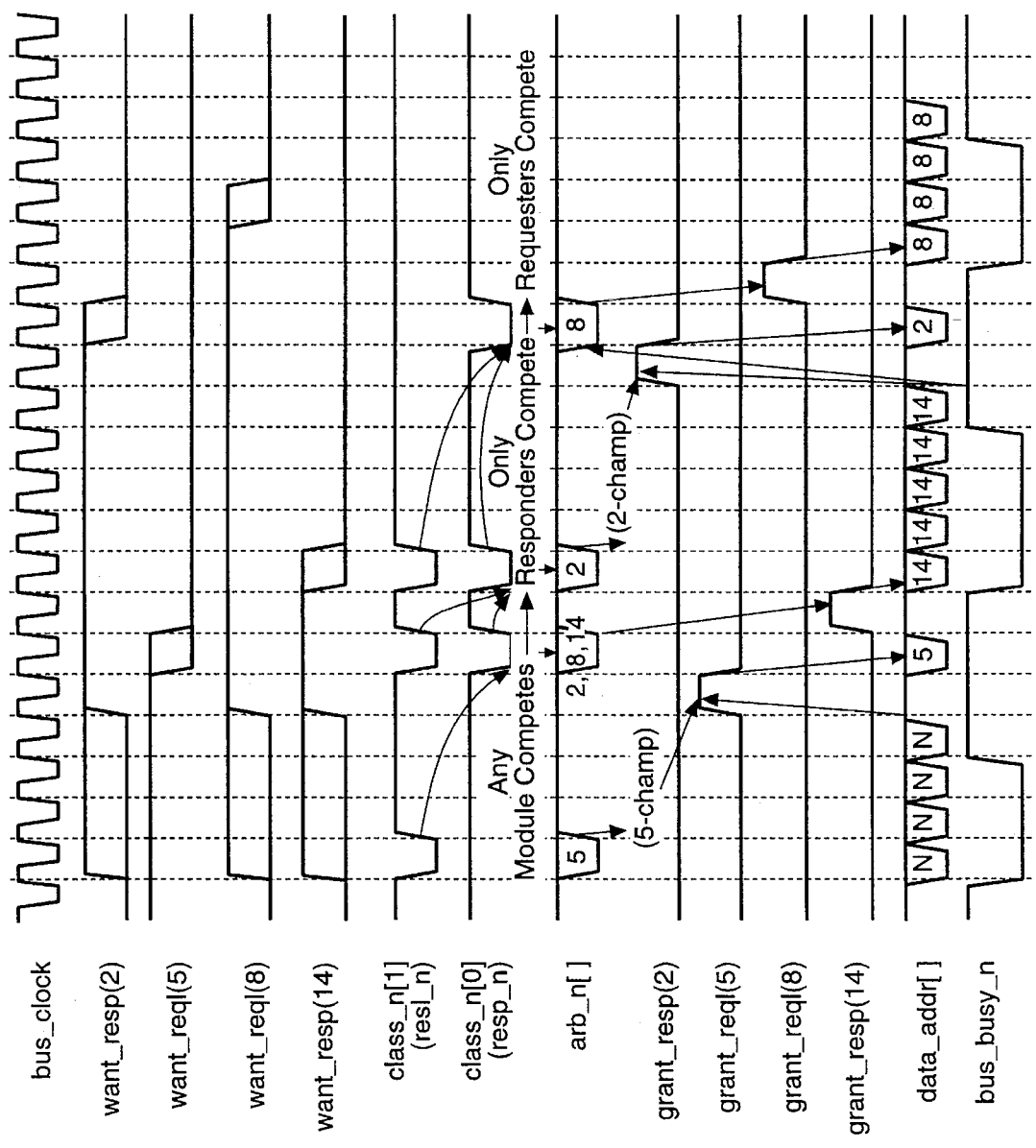
FIG._20

MULTIPROCESSOR COMPUTER BACKPLANE BUS IN WHICH BUS TRANSACTIONS ARE CLASSIFIED INTO DIFFERENT CLASSES FOR ARBITRATION

This application is a divisional of U.S. patent application Ser. No. 08/328,896, filed Oct. 25, 1994.

BACKGROUND OF THE INVENTION

1. Field of the Invention

The present invention relates to computer buses, more particularly to a backplane bus in a multiprocessor computer.

2. State of the Art

In computer systems, a bus is commonly used to communicate between logical blocks or modules. The modules connect to a common communications medium, such as a set of wires, or printed circuit board traces. The rules that govern the access of modules to the bus and data transfer constitute the bus protocol. Generally, all modules on a bus must use the same protocol.

In a typical bus implementation, a set of traces are embedded in one or more printed circuit boards. Modules connect to the bus through bus transceivers. Modules connected to a bus may all reside on the same printed circuit board. Alternatively, modules may reside on separate printed circuit boards and be attached to an electro-mechanical structure that incorporates the physical bus medium through a series of connectors. The physical bus medium, together with the electro-mechanical structure that incorporates it, is called the backplane bus.

In a multiprocessing computer, multiple processor are provided, each of which performs a portion of an overall computational task. A Symmetric Multi-Processing (SMP) computer is one in which each processor has substantially equal access to system resources in general. Typically in an SMP computer, multiple processor boards, memory boards and I/O boards plug into a common backplane bus to realize a robust, reconfigurable computer system. Processor boards may have multi-level caches, for example a primary on-chip cache, a fast secondary (e.g., SRAM) cache, and a slower tertiary (e.g., DRAM) cache. A cache coherency model is used to update data in various levels of caches among the various processor boards to ensure that out-of-date data is not used.

Various standards have been developed which define the physical features and protocols of different backplane busses, including, for example, the Pyramid C-Bus, the Intel/Siemens/BiiN AP-Bus, and the IEEE FutureBus/FutureBus+. Generally, the signal lines on standard backplane buses can be partitioned into logical groupings that include a data transfer bus, which includes address and data lines; an arbitration bus, which includes control acquisition lines; and a utility bus, which includes power leads and, on some buses, clock signals, initialization and failure detection lines.

One measure of bus performance is aggregate throughput, i.e., on average, how much data can be transferred across the bus in a given period of time. Throughput is in rum a function of raw bus speed (how fast signals can be driven) and bus utilization (how busy the bus can be kept). Another consideration in assessing bus performance is reliability and fault tolerance. Faults are inevitable in digital computer systems due, at least in part, to the complexity of the circuits and of the associated electromechanical devices, and to programming complexity. Computers and buses may be designed on the one hand to be reliable, or, on the other hand, may be designed to be fault tolerant. In a reliable computer system, faults are detected and operations suspended while the fault is diagnosed and the system is reconfigured to remove the faulty component. In a fault tolerant computer system, redundancy is designed into the system in such a manner that if a component fails, a redundant component is able to take up where the failed component left off without any perceptible delay. Fault tolerant design greatly increases system cost and complexity.

Apart from data lines, which may be parity protected, all buses have control lines, errors on which cause unwanted behavior. Most buses are not designed for fault resilience and simply tolerate the possibility of undetected errors on a small number of signals that have no error detection. In bus based fault resilient systems, a number of different solutions to the problem of detecting control signal errors have been employed. Voting between multiple sets of lines may be used to provide both error detection and correction. A protocol may be designed that does not have any signals that cannot be parity protected. A side band signal may be used to compute line status between checking agents. Another approach involves time based check pointing in which a signature register is check periodically to confirm consistent operation. Each of these measures is relatively complicated and costly.

Despite such complexity, the reliability of existing buses is compromised by the potential for single undetected points of failure. A need therefore exists for a high-reliability SMP backplane bus that is simpler than but offers comparable performance to existing buses.

SUMMARY OF THE INVENTION

The present invention, generally speaking, provides a high-performance, high-reliability backplane bus that is simple in its design and operation as compared to prior-art high-performance buses. More particularly, in accordance with one embodiment of the invention, a computer bus includes a first original signal line, a second redundant signal line, circuitry connected to the first original signal line and the second redundant signal line for driving the first original signal line and the second redundant signal line so as to convey on each identical information, circuitry for receiving signals on the first original signal line and the second redundant signal line, and error checking circuitry for comparing the signals on the first original signal line and the second redundant signal line and for indicating an error if the signals differ. By providing redundant signals for each signal that cannot be check with parity (for example wired-OR signals), the potential for single undetected points of failure is eliminated. In accordance with another embodiment of the invention, a computer having multiple modules connected by a backplane bus includes multiple competition signal lines and multiple class signal lines. Access to the backplane bus to engage in one or more of multiple types of bus transactions is arbitrated between the modules by classifying the bus transactions into different classes and, during each of a succession of competition cycles, when a module wants access to the backplane bus to engage in a particular type of bus transaction, asserting a class signal line corresponding to a class in which the particular type of bus transaction has been classified. Based on information presented on the class signal lines, it is determined which modules are or are not eligible to compete for access to the backplane bus. When a module is eligible to compete for access to the backplane bus, it drives an identification code associated with the module on the competition signal lines. Then, based on information presented on the competition signal lines, a module is granted access to the backplane bus.

BRIEF DESCRIPTION OF THE DRAWING

The present invention may be further understood from the following description in conjunction with the appended drawing. In the drawing:

FIG. 1 is a simplified block diagram of a computer system including the backplane bus of the present invention;

FIG. 2 is a diagram of a redundant signal implementation used to provide detection of backplane signalling errors;

FIG. 3 is a diagram illustrating a preferred byte ordering on the backplane bus;

FIG. 4 is a timing diagram illustrating status latency on the backplane bus;

FIG. 5 is a diagram of address information carried on the data address lines during address/command cycles;

FIG. 6 is a diagram showing the routing or error reporting lines;

FIG. 7 is a timing diagram showing the relationship in certain instances of the occurrence of a fatal error in relation to corrupt data;

FIG. 8 is a diagram showing an end or reporting serial message protocol;

FIG. 9 is a block diagram of a distributed bus arbiter;

FIG. 10 is a state diagram showing the manner in which competition is enabled during arbitration;

FIG. 11 is a timing diagram of an arbitration example in which bus acquisition for a read request transaction is uncontested;

FIG. 12 is a timing diagram of an arbitration example in which bus acquisition for a write block transaction is uncontested;

FIG. 13 is a timing diagram of an arbitration example in which bus hogging occurs;

FIG. 14 is a timing diagram of an arbitration example in which the bus is inherited by one module from another module;

FIG. 15 is a state diagram showing the arbitration protocol's class functions;

FIG. 16 is a state diagram of the arbitration protocol's competition functions;

FIG. 17 is a timing diagram of an arbitration example in which boards 13, 5 and 3 compete for the bus for read requests;

FIG. 18 is a timing diagram of an arbitration example in which boards 5, 2 and 1 compete for the bus for write word transactions;

FIG. 19 is a timing diagram of an arbitration example in which boards 2 and 5 compete for the bus for response transactions; and FIG. 20 is a timing diagram of an arbitration example in which boards 2 and 5 want the bus for response transactions and boards 8 and 14 want the bus for read responses.

DETAILED DESCRIPTION OF THE PREFERRED EMBODIMENT

The following detailed description describes the logical, electrical, and connector specifications of Pyramid Technology Corporation's R-Bus. The R-Bus is a proprietary backplane bus used to connect boards in Pyramid Technology NILE series systems. The R-Bus is a high-performance, block-oriented system bus that supports multiprocessor cache coherency, extensive error checking, and hardware fault tolerance.

Referring to FIG. 1, in a preferred embodiment, the R-Bus allows up to 30 boards to be connected to a R-Bus. Each board is identified by its slot, from slot 1 to slot 30. Some slots may be empty and some slots may contain boards. A board may contain up to four modules, designated module 0 to module 3. A particular R-Bus implementation may support fewer boards. For example, a smaller system's R-Bus implementation might support 12 slots.

Processor boards, memory boards, I/O boards, and other board types may be intermixed on the R-Bus. In other implementations, clock boards, certain I/O boards, or boot processor boards may be restricted to certain slots.

Electrically, in an exemplary embodiment, the R-Bus is a synchronous bus with a clock rate of 25 MHz. The R-Bus uses BTL (Bus Transceiver Logic) transceivers for most signals. The R-Bus data transfer path is 128 bits wide. The bus bandwidth is 400 Mbytes per second peak, 267 Mbytes per second for writes, 228 Mbytes per second for reads.

Logically, the R-Bus provides block transfer operations (64 bytes) and "partial" operations used to read or write 1, 4, or 8 bytes at a time. Read operations are split into separate read request and read response transactions, allowing other bus traffic to use the R-Bus during the actual memory access. A typical R-Bus block transfer consists of one address/command bus cycle followed by several data cycles followed by one rest cycle. Each data cycle transfers 16 bytes. For example, a block write consists of one address/command cycle followed by four data cycles, followed by one rest cycle, a total of six cycles. Because the R-Bus is block-oriented and provides a wide data path, high data transfer rates can be sustained. For example, with a 25 MHz clock and a 64-byte block size, data can be transferred at a rate of 2.13 billion bits per second, 267 million bytes per second.

Several R-Bus block transactions include cache coherency support, so that multiple processors sharing memory may keep their cache states consistent. More particularly, the R-Bus provides support for maintaining cache coherency in a system with multiple processors and with a cache interposed between each processor and the R-Bus. Processor modules using the R-Bus may use write-back or write-through caching strategies and may use any of a number of caching protocols.

The R-Bus does not require the use of any particular caching protocol. However, a number of bus signaling mechanisms are defined that may be used to implement a caching protocol. In particular, a processor can intervene in a block read to supply more recent data from its cache. Blocks can be read "shared" (allowing other processors to also cache the block) or "exclusive" (not allowing other processors to cache the block). An invalidate bus transaction can be used to eliminate a block from other caches in the system, thus making the block exclusive.

The R-Bus supports read-partial and write-partial transactions used to access hardware registers. These transactions can transfer 1, 2, 4, or 8 bytes. A hardware register's address must be a multiple of the transfer size used to access the register.

When a module needs to send a bus transaction, it must gain and keep exclusive control of the bus's data transfer lines for the transaction's duration. Modules contend for, acquire, hold, and relinquish that control through a process called arbitration. As described in greater detail hereinafter, the R-Bus arbitration protocol uses a dedicated set of lines, is distributed (compatible arbitration logic is present on each board with no "master" of the arbitration process), and has low overhead, because arbitration may take place while a transaction is using the bus's data transfer lines.

The R-Bus provides different kinds of system service lines including clock, reset, and error reporting lines. More particularly, the R-Bus provides a single bus clock. All R-Bus data transfer and arbitration lines are synchronous to the bus clock. The bus clock frequency in a preferred embodiment is 25 Mhz. The R-Bus reset lines can be used to reset just the core subsystem or both the core and I/O subsystems.

The R-bus also provides for error detection and error reporting. As described in greater detail hereinafter, the R-Bus error reporting lines can be used to implement a serial error reporting protocol.

R-Bus data transfer lines that are only driven by the current bus master are protected by parity lines, with at most eight lines protected by one parity line. The parity used may be odd or even, but is selected so that if all the protected lines and the parity line are high, then the parity is correct.

Certain R-bus lines are wire-ORed so as to be driven by multiple boards. R-Bus lines that can be driven by multiple boards are replicated in order to provide error detection. The original signal and the replicated signal are compared, with any non-coincidence of the two signals causing an error signal to be generated.

FIG. 2 shows a representative implementation of redundant signal error checking. In FIG. 2, latches required to interface to the R-Bus are omitted. For maximum fault coverage, replicated signals use different transceiver packages. In a preferred embodiment, the following signals, which cannot be checked with parity because they implement wired-OR functions, are duplicated to provide detection of backplane signalling errors. The signal name of each redundant signal is "r_" followed by the original signal name: r_status_n[4:0]; r_arb_n[4:0]; r_reqh_n; r_reql_n; and r_resp_n.

In a preferred embodiment, R-Bus signals, with a small number of exceptions, use BTL voltages and currents defined in IEEE P1194.1. Typical BTL levels are +2 V (high) and +0.9 V (low). A few signals (bus_clock, bus_id, slot_id[], and bus_disable_n) use TTL levels. Typical TTL levels are +2.4 V (high) and +0 V (low). The R-Bus provides ground (0 V reference), +5 V, and +3.3 V power supplies. All data transfer and arbitration signals are synchronous to the rising edge of the bus_clock signal.

The R-Bus signals are divided into four groups: Data Transfer, Arbitration, System Services, and Diagnostic. The Data Transfer lines transfer address, data, and status, and define the type of bus transaction (read, write, invalidate, etc.) to be executed. The Arbitration lines control bus acquisition. System Services lines provide miscellaneous global information to all units within the system. The Diagnostic lines are output-only signals which provide information useful in system debugging. Table 1 lists all R-Bus signals. A number of spare lines are reserved for future use. In Table 1 and in the following description, signal names do not use uppercase letters. The designation "_n" at the end of a signal name indicates the signal is active-low, "_p" at the end of a signal name indicates the signal carries parity information, and "r_" at the beginning of a signal name indicates the signal carries redundant information for error detection.

The R-Bus is, by convention, big-endian. As a result, bytes, words, and double-words are ordered on the bus as shown in FIG. 3. The R-Bus, however, does not require big-endian byte ordering, but could also support little endian systems.

TABLE 1

R-Bus Signal List

| Name | Level | Description | Lines | Totals |
|---|---|---|---|---|
| Data Transfer | | | | |
| data_addr_n[127:0] | BTL | Data/address/command bus | 128 | |
| data_addr_p[15:0] | BTL | Data/address/command bus byte parity | 16 | |
| src_id_n[6:0] | BTL | Source identitier | 7 | |
| src_id_p | BTL | Source identitier parity | 1 | |
| dest_id_n[6:0] | BTL | Destination identifier | 7 | |
| dest_id_p | BTL | Destination identifier parity | 1 | |
| cntrl_n[3:0] | BTL | Bus control field | 4 | |
| cntrl_p | BTL | Bus control parity | 1 | |
| status_n[3:0] | BTL | Transaction status | 4 | |
| r_status_n[3:0] | BTL | Redundant transaction status | 4 | |
| Subtotal | | | | 173 |
| Arbitration | | | | |
| arb_n[4:0] | BTL | Arbitration competition network | 5 | |
| r_arb_n[4:0] | BTL | Redundant arbitration competition network | 5 | |
| class_n[2:0] | BTL | Arbitration class | 3 | |
| r_class_n[2:0] | BTL | Redundant arbitration class | 3 | |
| bus_busy_n | BTL | Bus busy during next cycle | 1 | |
| r_bus_busy_n | BTL | Redundant bus busy during next cycle | 1 | |
| inherit_n | BTL | Inherit during next cycle | 1 | |
| r_inherit_n | BTL | Redundant inherit during next cycle | 1 | |
| Subtotal | | | | 20 |
| System Services | | | | |
| bus_clock | TTL | Bus clock | 1 | |
| slot_id[4:0] | TTL | Physical backplane slot number | 5 | |
| board_disable_n | TTL | Board disabled | 1 | |

TABLE 1-continued

R-Bus Signal List

| Name | Level | Description | Lines | Totals |
|---|---|---|---|---|
| rst_n[2:0] | BTL | Reset bus | 3 | |
| err_n[3:0] | BTL | Error reporting network | 4 | |
| Subtotal Diagnostic | | | | 14 |
| snoop_busy_n | BTL | Snoop logic busy | 1 | 1 |
| Spares | | | | |
| spare[16:0] | | Spare lines reserved for future use | 17 | 17 |
| Total | | | 225 | 225 |

All R-Bus parity bits are defined such that an un-driven bus yields connect parity. Bus lines are terminated such that when they are not driven they float to a high signal level. Thus when all bits in a field, including the parity bit, are high, the field is considered to have correct parity.

The functions of the various bus lines within each group of bus lines will be described in greater detail.

The Data Transfer bus lines are used by bus transactions. The lines data_addr_n[127:0] transmit 8–128 bits of data during data cycles, or a 36-bit address and a 4-bit command during address/command cycles. Each of the lines data_addr_p[15:0] transmits parity for one group of eight data_addr_n[] lines. Each data_addr_p[i] line checks data_addr_n[127–8i: 120–8i], as shown in Table 2. A data_addr_p line is high if an even number of bits in the corresponding data_addr_n[] byte are high. A data_addr_p line is low if an odd number of bits in the corresponding data_addr_n[] byte are high.

TABLE 2

Data/Address Parity Field

| Parity Signal... | Checks... |
|---|---|
| data_addr_p[0] | data_addr_n[127:120] |
| data_addr_p[1] | data_addr_n[119:112] |
| data_addr_p[2] | data_addr_n[111:104] |
| date_addr_P[3] | data_addr_n[103:96] |
| data_addr_p[4] | data_addr_n[95:88] |
| data_addr_p[5] | data_addr_n[87:80] |
| data_addr_p[6] | data_addr_n[79:72] |
| data_addr_p[7] | data_addr_n[71:64] |
| data_addr_p[8] | data_addn_n[63:56] |
| data_addr_p[9] | data_addr_n[55:48] |
| data_addr_p[10] | data_addr_n[47:40] |
| data_addr_p[11] | data_addr_n[39:32] |
| data_addr_p[12] | data_addr_n[31:24] |
| data_addr_p[13] | data_addr_n[23:16] |
| data_addr_p[14] | data_addr_n[15:8] |
| data_addr_p[15] | data_addr_n[7:0] |

During all address/command and data cycles, the field src_id_n[6:0] carries the current master's 7-bit module number. The portion src_id_n[6:2] is the module's slot ID. The portion src_id_n[1:0] identifies one of four logical modules which may share a common slot. The signal src_id_p transmits a parity check bit for the src_id_n[] field. The signal src_id_p is high if an odd number of bits in the src_id_n[] field are high, and is low if an even number of bits in the src_id_n[] field are high.

During response transactions, the field dest_id_n[6:0] carries the 7-bit module number of a destination module. The portion dest_id_n[6:2] is the destination module's slot ID. dest_id_n[1:0] identifies one of four logical modules which may share a common slot. A dest_id_n[] value of 0 (value if not driven) is used when the transaction is not directed at a specific module but uses the address to determine the slave modules.

The signal dest_id_p transmits a parity check bit for the dest_id_n[] field. The signal dest_id_p is high if an odd number of bits in the dest_id_n[] field are high. The signal dest_id_p is low if an even number of bits in the dest_id_n[] field are high.

A bus master transmits control information on the cntrl_n[3:0] lines which defines the state of the data transfer lines on the current bus cycle.

The signal cntrl_n[0] functions as an data-valid signal, data_valid_n, asserted whenever the data_addr_n[] lines contain data.; the signal cntrl_n[1] functions as an address-valid signal, addr_valid_n, asserted whenever the data_addr_n[] lines contain a command and, possibly, an address; the signal cntrl_n[2] functions as a signal indicating more data to come, more_data_n, asserted on any bus transaction that is not the last cycle, whether that cycle is a data cycle or an address/command cycle; and the signal cntrl_n[3] functions as a data error signal, data_err_n, asserted whenever the data currently on the data_addr_n[] lines is known to contain errors. A memory, for example, would assert data_err_n during a read response transaction if an un-correctable error occurred during the memory fetch. The signal cntrl_p transmits a parity check bit for the cntr_n[] field. The signal cntr_p is high if an even number of bits in the cntr_n[] field are high (negated) and is low if an odd number of bits in the cntr_n[] field are high (negated).

One or more modules may assert one or more status_n[] lines in response to a valid address/command or data cycle. The status latency is always four bus cycles, as shown in FIG. 4. Since the status_n[] lines implement a wired-OR function, they are protected by redundant lines instead of a parity bit.

The signal status_n[0] functions as an acknowledge signal, ack_n; the signal status_n[1] functions as a not-ready signal, not_ready_n; the signal status_n[2] functions as a "shared" signal, shared_n; and the signal status_n[3] functions as an "intervene" signal, intervene_n.

A slave asserts ack_n in all status cycles of a transaction to indicate that it has recognized the address or destination ID. If ack_n is not returned, no module in the system recognizes the address or destination ID. This condition may cause an error to be indicated.

A slave asserts not_ready_n with ack_n in a transaction's first status cycle if the slave has recognized the address or destination ID, but is temporarily unable to perform the requested operation. A snooper (i.e., a caching module that is neither master or slave, but monitors the bus transaction and takes action as needed to maintain cache coherency) asserts not_ready_n without asserting ack_n in a transaction's first status cycle if the snooper cannot maintain cache coherency for the operation. If not_ready_n and ack_n are both asserted in the first status cycle, then the master knows that the transaction has failed. The master may retry the operation at a later time.

One or more modules may assert shared_n in the first status cycle of a read-shared request transaction, described in greater detail hereinafter. A module asserts shared_n to signal it expects to keep a valid copy of the requested block in its cache. The signal shared_n is a diagnostic signal only. It is not used as part of the cache coherency protocol.

One module only may assert intervene_n in the first status cycle of a read-block request transaction, described in greater detail hereinafter. A module asserts intervene_n to indicate it has a valid dirty or exclusive copy of the requested block in its cache and the memory may no longer contains a valid copy of the block. This causes the memory to abort the read operation and stay off the bus. Instead of memory, the module which asserted intervene_n must then provide the requested data to the bus.

The lines r_status_n[3:0] are duplicates of status_n[] for error checking. Modules must always drive the same pattern on r_status_n[] as on status_n[]. If any bit in r_status_n[] ever differs from the corresponding bit in status_n[] on a status cycle, then each module that receives that status must signal a fatal error.

The arbitration lines are used to determine which board gains control of the bus, and to restrict control of the bus to one board at a time. The arbitration mechanism is described in greater detail hereinafter. Since the arbitration lines implement a wired-OR function, they are protected by redundant lines instead of parity bits.

The arb_n[4:0] lines determine the precedence of boards competing for control of the bus. Unlike other lines which run the entire length of the backplane, the arb_n[] lines are connected in the binary pattern shown in Table 3. Each board either drives or receives each arb_n[] signal depending on its physical location in the backplane. On each board, if slot_id[i]=1, the board asserts arb_n[i], asserting it when competing, negating it otherwise; if slot_id[i]=0, the board receives but does not asserts arb_n[i]. For each backplane slot, Table 3 shows which lines the board asserts ("out") and which does not assert ("in").

TABLE 3

| | arb_n[] backplane connections | | | | |
|---|---|---|---|---|---|
| Slot | arb_n[4] | arb_n[3] | arb_n[2] | arb_n[1] | arb_n[0] |
| 0 | in | in | in | in | in |
| 1 | in | in | in | in | out |
| 2 | in | in | in | out | in |
| 3 | in | in | in | out | out |
| 4 | in | in | out | in | in |
| 5 | in | in | out | in | out |
| 6 | in | in | out | out | in |
| 7 | in | in | out | out | out |
| 8 | in | out | in | in | in |
| 9 | in | out | in | in | out |
| 10 | in | out | in | out | in |
| 11 | in | out | in | out | out |
| 12 | in | out | out | in | in |
| 13 | in | out | out | in | out |
| 14 | in | out | out | out | in |
| 15 | in | out | out | out | out |
| 16 | out | in | in | in | in |
| 17 | out | in | in | in | out |
| 18 | out | in | in | out | in |

TABLE 3-continued

| | arb_n[] backplane connections | | | | |
|---|---|---|---|---|---|
| Slot | arb_n[4] | arb_n[3] | arb_n[2] | arb_n[1] | arb_n[0] |
| 19 | out | in | in | out | out |
| 20 | out | in | out | in | in |
| 21 | out | in | out | in | out |
| 22 | out | in | out | out | in |
| 23 | out | in | out | out | out |
| 24 | out | out | in | in | in |
| 25 | out | out | in | in | out |
| 26 | out | out | in | out | in |
| 27 | out | out | in | out | out |
| 28 | out | out | out | in | in |
| 29 | out | out | out | in | out |
| 30 | out | out | out | out | in |
| 31 | out | out | out | out | out |

When a board competes for bus ownership it drives a logic one on all of its arb_n[] outputs. The arb_n[] network carries this signal to all lower numbered slots. At the same time the board receives signals on the arb_n[] lines from all higher numbered slots. Thus, the board can determine immediately whether or not it wins the arbitration.

The lines r_arb_n[4:0] are duplicates of arb_n[] for error checking. Modules must always drive the same pattern on r_arb_n[] as on arb_n[]. If any bit in r_arb_n[] ever differs from the corresponding bit in arb_n[], then a fatal error is signaled.

The lines class_n[2:0] implement round-robin arbitration for three classes of competitors which want the bus for three different types of transactions. The class_n[0] functions as a response signal, resp_n, the class_n[1] functions as a low-priority request signal, reql_n and the class_n[2] signal functions as a high-priority request signal, reqh_n.

Modules assert the resp_n line to request the bus for a response transaction. This line is used for all transactions that "give up cache ownership," including write-no-snoop (cast-outs), write-snarf (read response and update memory), some write-partial, read-block-response, read-partial-response, and read-retry-response transactions, all of which are described in greater detail hereinafter.

Modules assert the reql_n line to request the bus for a low-priority request transaction. This line is used for all transactions that "get cache ownership," including read-shared-request, read-browse-request, read-exclusive-request, read-exclusive-IO-request, read-partial-request, invalidate, some write-partial, and write-clobber transactions, all of which are described in greater detail hereinafter.

Modules assert the reqh_n line to request the bus for a high-priority request transaction. High priority is used for previously low-priority request transactions that have received excessive number of rejections by not ready status.

The lines r_class_n[2:0] are duplicates of class_n[] for error checking. Modules must always drive the same pattern on r_class_n[] as on class_n[]. If any bit in r_class_n[] ever differs from the corresponding bit in class_n[], then a fatal error is signaled.

The current bus master asserts bus_busy_n to signal that it will retain ownnership of the bus on the next cycle. This prevents any other unit from taking control of the bus until after the current master is done. The signal bus_busy_n is not asserted on the last cycle of any transaction. For a single-cycle transaction such as read-request or invalidate, bus_busy_n is not asserted at all. The r_bus_busy_n line is a duplicate of bus_busy_n for error checking. Modules must always drive the same level on r_bus_busy_n[] as on bus_busy_n[]. If r_bus_busy_n[] ever differs from bus_busy_n[], a fatal error is signaled.

The current bus slave asserts inherit_n to signal that it will take ownership of the bus after the completion of the current transaction. This signal prevents any other unit from taking control of the bus until after the current slave changes in to bus master. The signal inherit_n can be asserted during any cycle of a response transaction. Only the module addressed by the dest_id_n[] signals can assert inherit_n. The r_inherit_n line is a duplicate of inherit_n for error checking. Modules must always drive the same level on r_inherit_n[] as on inherit_n[]. If r_inherit_n[] ever differs from inherit_n[], a fatal error is signaled.

The System Services lines provide miscellaneous global signals to all backplane slots.

The bus_clock signal provides a TTL-level 25 MHz system clock. All R-Bus signals except board_disable_n, slot_id[], and bus_id are synchronous to the rising edge of bus_clock. The bus_clock signal is generated on a central clock board and fanned out so that each backplane slot receives an individual copy of the clock signal. To minimize skew, the individual clock lines are routed on the backplane such that they all have equal length.

A module asserts the TTL-level signal board_disable_n asynchronously to notify all other modules in the system that it is disabled because of a condition such as a clock failure or the on-board reset signal is asserted. All other R-Bus outputs must be negated while board_disable_n is asserted. Any condition that asynchronously disables the backplane transceivers also asynchronously asserts this board_disable_n signal. Other modules respond to board_disable_n being asserted by generating an error report to notify software of a possible error condition.

The backplane provides, via the slot_id[] pins, a binary number to each board representing the number of the slot in which the board is located. Boards receive slot_id[] using a TEL buffer with pull-up resistors on the inputs. The backplane represents logic ZERO as a connection to ground, and logic ONE as no connection. In a preferred embodiment, allowable slot ID values are 1–30. A slot_id[] value of 0 is not supported because this ID is reserved as ID value used on the dest_id[] value used when no particular board is selected. A slot_id[] value of 31 ($1F_{16}$) is not supported because this ID is reserved for broadcast and local ID.

The signals rst_n[2:0] reset the core and I/O subsystems per Table 4. The encoding is such that the failure of any single bit cannot cause a spurious system reset. All R-Bus modules receive rst_n[1:0]. Modules which control non-slave I/O subsystems must also receive rst_n[2]. Any module may drive rst_n[2:0]. A central reset source, such as the clock board, may also drive rst_n[2:0]. The minimum duration of the conjunction of rst_n[0] and rst_n[1], or of rst_n[0], rst_n[1], and rst_n[2] is 1 cycle.

TABLE 4

| rst_n[2:0] encoding | | | |
|---|---|---|---|
| rst_n[] | | | |
| 2 | 1 | 0 | Action |
| x | x | 0 | None |
| x | 0 | x | None |
| 0 | 1 | 1 | Reset core subsystem |
| 1 | 1 | 1 | Reset core and I/O subsystems |

The signals err_n[3.0] transmit error report and recovery data. The communication protocol used, report formats, and error codes are described more fully hereinafter.

The signal err_n[0] functions as an error interrupt signal, err_int_n. A module asserts err_int_n to notify all other modules in the system that a non-fatal error, such as a correctable ECC error or a bus time-out, has occurred. The signal err_n[1] functions as a redundant error interrupt signal, r_err_int_n. In most cases err_n[1] is treated like the other redundant signal lines, except for boards that have multiple independent modules, in which error detecting logic in one half of the board signals error interrupts on err_n[0] while the logic in the other half signals error interrupts on err_n[1]. For example on a dual processor unit (DPU) board which has two independent CPUs, CPU-A drives err_n[0] while CPU-B drives err_n[1].

The signal err_n[2] functions as a fatal error signal, err_fatal_n. A module asserts err_fatal_n to notify all other modules in the system that the data on the bus is corrupted and a fatal error, such as an uncorrectable ECC error, a bus parity error, or FRC failure, has occurred. The signal err_n[3] function as a redundant fatal error signal, r_err_fatal_n. In most cases err_n[3] is treated like the other redundant signal lines, except for boards that have multiple independent modules, in which error detecting logic in one half of the board signals error interrupts on err_n[2] while the logic in the other half signals error interrupts on err_n[3]. For example on DPU board which has two independent CPUs, CPU-A drives err_n[2] while CPU-B drives err_n[3].

The diagnostic lines, including snoop_busy_n, provide information which can be helpful in debugging a R-Bus system. They are not necessary for correct bus operation. They are output-only for all R-Bus modules and may be received only by test equipment.

A module gains control of the R-Bus data transfer lines using the R-Bus arbitration protocol. The module then becomes the bus master. The master issues at least one bus transaction and then releases the bus for use by the next master, which may be the same module. A bus transaction transfers information from the master to one or more slave modules using the data transfer lines. The master and slave may be the same module.

A transaction is a sequence of consecutive cycles using one of the following transaction formats: one address/command cycle; one address/command cycle immediately followed by one data cycle; one address/command cycle immediately followed by 4 data cycles; one data cycle; or 4 data cycles, where the block size is 64 bytes.

A bus master asserts more_data_n (cntr_n[2]) on all cycles that have more data in the bus transaction. The signal more_data_n is de-asserted on a bus transaction's last cycle. If a transaction contains one cycle, then the master deasserts more_data_n on that cycle.

Associated with each transaction is a sequence of consecutive status cycles, with one status cycle for each address/command cycle or data cycle. A status cycle always occurs four bus cycles after its associated address/command or data cycle. Status cycles can overlap a block transaction's data cycles and can also overlap the address/command or data cycles of subsequent transactions.

A transaction's type is identified by the address/command cycle or, if there is no address/command cycle, by the number of data cycles.

If a master does not assert bus_busy_n on the first cycle it has mastership, then the transaction must be one cycle, or the master may not issue a transaction. If a master asserts bus_busy_n on the first cycle it has mastership, then it retains mastership through the first cycle that bus_busy_n is negated.

A master normally negates bus_busy_n in a transaction's last cycle, allowing other modules to arbitrate for mastership. A master may keep mastership for multiple transactions, called bus hogging, by continuing to assert bus_busy_n. Bus hogging should be used carefully, because of the risk that other modules will be unable to access the R-Bus for too long a time.

After a module is granted the bus, idle cycles may precede or follow a transaction. A module may acquire mastership and not issue a transaction. However, bus masters are not allowed to insert idle cycles within a transaction.

If a transaction contains an incorrect number of cycles for its type or contains an address/command cycle or idle cycle where a data cycle is required, then the transaction is erroneous. Any module may signal an error if it detects an erroneous transaction on the bus.

Bus transactions are used to implement reads and writes of data in particular memory locations. The R-Bus protocol distinguishes two types of memory: cacheable memory and registers. Cacheable memory may only be read or written using block transactions. A block in cacheable memory may also exist in caches in the system. Registers may only be read or written using partial transactions. Registers may not be cached. Registers may be used to control or record hardware operation or to access non-cacheable memory arrays. Provision may also be made for other additional types of memory.

R-Bus transactions can be classified as block transactions or partial transactions. Block transactions transfer or affect memory blocks. A block is 64 bytes aligned on a 64 byte boundary. Partial transactions access registers. A write-partial transaction or read-partial request transaction specifies a transfer size of 1, 4, or 8 bytes.

All transfers are "naturally" aligned. That is, all blocks begin on a block address boundary, all double-words begin on a modulo-8 address boundary, and all words begin on a modulo-4 address boundary.

During partial transaction data cycles not all of the 128 data_addr_n[] lines are used: 64 bits are defined for double-word transfers, 32 bits for word transfers, and 8 bits for byte transfers. The position of the valid data on the bus depends on the address of the data being transferred. The ordering shown in FIG. 3 also defines which bus lines are valid for any partial transfer. All bus lines not transferring data are undefined, but have correct parity.

Block transfers deliver the quadword at the beginning of the block (the quadword with the lowest address within the block) first, then progress sequentially through the quadwords that form the block.

Bus transactions occur using three module types: caching processors, non-caching processors, and memory modules. A caching processor is an active module that caches memory blocks and "snoops" (monitors) the bus to maintain cache coherency. A non-caching processor is an active module that does not cache memory blocks. A memory module is a passive repository for data. Data in memory can be read or written. All three module types may contain registers.

Modules may have additional types besides those described, but may still behave like one of the foregoing module types. For example, an I/O board may behave like a non-caching processor, if it contains an active IJO processor, or like a memory module, if it implements passive memory-mapped I/O.

Write and invalidate operations are both done with a single bus transaction (unless a not-ready status causes a retry). Read operations, however, are split into two bus transactions: a request transaction which transfers the memory address and command from a processor to memory, and a response transaction which transfers the requested data back to the processor. The response will be one of the following: a read-partial response, a read-block response, a read-retry response, or a write-snarf.

During the request transaction a processor is the master and the memory is the slave. During the response transaction, the memory is the master and the processor is the slave. The src_id_n[] field specified in the request becomes the dest_id_n[] field in the response.

For a read-block request, if another processor has the requested block in its cache with the block tagged dirty, it intervenes in the request transaction and transfers the requested data to the requester and to memory with a write-snarf transaction. If another processor has the requested block exclusive in its cache, it may intervene and transfer the requested data with a read-block response transaction.

The response begins six or more bus cycles after the request completes. During the time between request and response the bus is free to carry other traffic. The six-cycle minimum latency is required to allow memory to test intervene_n and abort its response if a snooper intervenes.

After a module issues a read-request on the bus, the module may not issue another read request on the bus until a read response is received for the already issued request.

A write-partial transaction is normally directed at a single destination module. However, a write-partial transaction may also be a multicast or broadcast, directed to a set of modules or to all modules that implement a certain register or memory location. For example, a particular address may indicate a broadcast to a certain type of board.

Read requests may not be recognized by more than one slave. A multicast or broadcast read request is erroneous. Furthermore, block write requests may not be recognized by more than one slave. A multicast or broadcast block write request is erroneous.

There are three basic transaction outcomes: Transaction OK, No acknowledgment, and Not ready. If a transaction's outcome is "transaction OK" then the transaction succeeds. The transaction is acknowledged (ack_n is asserted) on all status cycles. Also, if a not-ready outcome is possible, not_ready_n must be negated on the first status cycle. If a transaction's outcome is no acknowledgment or not ready, then the transaction fails.

In the case of No acknowledgment, the transaction is not acknowledged (ack_n is negated) on any status cycle. If ack_n is negated on the first status cycle (a no acknowledgment result), then no module may recognize the specified address or destination ID. If there are multiple status cycles and ack_n is negated on any status cycle, then the data transferred may not be accepted by any slave or snooper.

A snooper shall not drive ack_n; acknowledging is done by any slaves. All modules participating in the transaction determine the not-ready outcome from the received status; not_ready_n and ack_n must both be asserted in the first status cycle.

In the case of Not ready, not_ready_n is asserted with ack_n on the first status cycle. A not-ready outcome indicates that a slave or snooper is temporarily not ready and that the transaction may be retried. A not-ready outcome is not possible and not allowed for a read response transaction. A not-ready outcome is allowed for a write-snarf transaction, which may occur in response to a read-block response. If a transaction has a not-ready outcome, then the memories and caches in the system must not change state because of the transaction.

For read operations, a read-retry response may be returned to indicate that the slave is temporarily not ready but was unable to indicate not-ready in time for the read request's first status cycle. A module may retry a transaction if the transaction fails or if a read-retry response is received after a read request. If a multi-cycle transaction fails, the master must nevertheless issue all remaining cycles in the transaction.

If a particular transaction type is not snooped, then a module or board may bypass the R-Bus when performing those transactions within the module or board. The module or board may also use the R-Bus in the normal way. If a particular transaction type is snooped, then all transactions of that type must be issued via the R-Bus, to maintain cache coherency.

Each module contains several time-out counters, including arbitration time-out counters, retry time-out counters, and a response time-out counter. When a module performs starts arbitrating, the module counts the number of bus cycles that it has been requesting access to the bus with gaining access. If the arbitration time-out counter is enabled and the count exceeds an implementation defined threshold, then the module shall signal an error. When a module performs a write (including write-snarf), invalidate, or read-request operation, the module counts the number of times the transaction status indicates not ready or that a read-retry response is received for the same read-request operation. If the retry time-out counter is enabled and the count exceeds an implementation defined threshold, then the module shall signal an error. When a module performs a read operation, the module counts the number of bus cycles between a read request and a response. If the transaction status for the read request indicates no acknowledgment or not ready or if a response is received (including a read-retry response), then the count is cleared. If the response time-out counter is enabled and the count exceeds an implementation defined threshold, then the module shall signal an error.

A transaction may be not be interrupted in normal operation. Transactions can be interrupted by a R-Bus reset, a local module reset, or by a board being disabled. Interrupted transactions are erroneous and other module on the R-Bus may detect errors.

Cache coherency is a desired property of a system containing multiple caches. A system has cache coherency if no cache contains an obsolete value for a block. However, memory may contain an obsolete value for a block. Cache coherency is maintained through a set of rules called a cache coherency protocol. The R-Bus provides mechanisms used to implement a cache coherency protocol.

The following terms to describe a memory block's state with respect to a particular cache:

Invalid: the cache does not contain the block.

Clean: the cache contains the block and the cached block is the same as the block in memory. A clean block is in either the shared or exclusive state.

Shared: the cache contains the block, the block is clean, and other caches may also contain the block in the shared state.

Exclusive: the cache contains the block, the block is clean, and other caches do not contain the block.

Modified (Dirty): the cache contains the block and the cached block is more recent than the block in memory (memory is obsolete). Other caches do not contain the block.

A caching module snoops a bus transaction when it is neither master or slave, but monitors the transaction and takes action as needed to maintain cache coherency. Non-caching modules may not snoop and may omit snooping logic. Snoopers take the following actions to maintain cache coherency:

If a snooper holds in cache a block that is in the dirty state, then the snooper must intervene in any read-shared request, read-exclusive request, read-browse request, or read-exclusive-IO request transaction addressed to that block. If the received transaction status is transaction OK, then the snooper must supply the requested block using a write-snarf transaction. The write-snarf transaction updates memory as well. If the request was a read-exclusive request or read-exclusive-IO request, then the snooper must invalidate the block in its cache after the write-snarf transaction succeeds of the request was a read-shared request, then the snooper may invalidate the block or may continue to cache the block in the shared state. If the request was a read-browse request, then the snooper may invalidate the block or may continue to cache the block in the shared or exclusive state.

If a snooper caches a block in the exclusive state, then the snooper may intervene in any read-shared request, read-exclusive request, read-browse request, or read-exclusive-IO request transaction. If the received transaction status is transaction OK, then the snooper must supply the requested block using a read-block response. If the request was a read-exclusive request or read-exclusive-IO request, then the snooper must invalidate the block in its cache after the read-block response succeeds. If the request was a read-shared request, then the snooper may invalidate the block or may continue to cache the block in the shared state. If the request was a read-browse request, then the snooper may invalidate the block or may continue to cache the block in the shared or exclusive state.

If a write-clobber transaction succeeds, then all snoopers that cache the block must invalidate the block and abort all pending write-block (castouts) to that block. If an invalidate transaction succeeds, then all snoopers that cache the block must invalidate the block.

A snooper must assert not_ready_n in a transaction's first status cycle if the snooper is unable to snoop the transaction. A snooper must not assert ack_n. Acknowledging is done by any slave modules. A snooper must not change its cache state in response to a transaction until the transaction and any response from the snooper succeed.

Transaction Types

Table 5 lists all R-Bus transactions and provides for each transaction the number of address/command cycles, the number of data cycles, the total number of cycles (not including status cycles), whether dest_id_n[] is valid during the transaction, whether the transaction is a block or partial transaction, and whether the transaction is snooped.

TABLE 5

R-Bus Transactions

| Transaction | A/C Cycles | Data Cycles | Total | dest_id_n [] | Block/ Partial | Snooped |
|---|---|---|---|---|---|---|
| Writes | | | | | | |
| Write-partial | 1 | 1 | 2 | No | Partial | No |
| Write-clobber | 1 | 4 | 5 | No | Block | Yes |
| Write-no-snoop | 1 | 4 | 5 | No | Block | No |
| Write-snarf | 1 | 4 | 5 | Yes | Block | No |
| Reads | | | | | | |
| Read-Partial request | 1 | 0 | 1 | No | Partial | No |
| Read-Shared request | 1 | 0 | 1 | No | Block | Yes |
| Read-Browse request | 1 | 0 | 1 | No | Block | Yes |
| Read-Exclusive request | 1 | 0 | 1 | No | Block | Yes |
| Read-Exclusive-IO request | 1 | 0 | 1 | No | Block | Yes |
| Invalidate | 1 | 0 | 1 | No | Block | Yes |
| Responses | | | | | | |
| Read-Partial response | 0 | 1 | 1 | Yes | Partial | No |
| Read-Block response | 0 | 4 | 4 | Yes | Block | No |
| Read-Retry response | 1 | 0 | 1 | Yes | Either | No |

As described earlier, a bus transaction contains zero or one address/command cycles; zero, one, or 4 data cycles, and one status cycle for each address/ command or data cycle.

An address/command cycle is defined by addr_valid_n asserted. During address/command cycles:

cntr_n[3:0] is xx10$_2$.

cntr_n[0]: data_valid_n is 0.

cntr_n[1]: addr_valid_n is 1.

cntr_n[2]: more_data_n is 1 if there are more data cycles in the transaction.

cntr_n[2]: more_data_n is 0 if this is a single cycle transaction.

During address/command cycles, data_addr_n[127:0] contain address and command information as shown in FIG. 5. The command field, data_addr_n[45:42], encodes the transaction type per Table 6. For block transfers of 64 bytes, data_addr_n[35:6] transmits the most significant bits of the block address; data_addr_n[41:40] and data_addr_n[5:0] are undefined. For read- and write-partial transfers, data_addr_n[41:40] encodes the data size per Table 7, and the data_addr_n[] bits specified in the table transmit the address, while the least significant address bits are undefined. The signals data_addr_n[39:36] are undefined and reserved for future address expansion. Higher-level protocols may use the undefined bits data_addr_n[127:46] to transmit additional information without affecting the operation of the R-Bus, as long as correct parity is provided.

TABLE 6

Command Field Encodings

| data_addr_n[45:42] | | | Operation | |
|---|---|---|---|---|
| binary | hex inverted | hex positive | Formal Name | Alternate names |
| 1110 | C7 |    | Read-Retry response | delayed not_ready_n |
| 1101 | CB | 20 | Invalidate | |
| 1100 | CE | 31 | Read-Partial request | Control register read request |
| 1011 | D3 | 2C | Read-Browse request | Block fetch no state change (rd-sh-IO) |
| 1010 | D7 | 28 | Read-Shared request | Block fetch |
| 1001 | DB | 24 | Read-Exclusive-IO request | Block fetch-invalidate from IO |
| 1000 | DF | 20 | Read-Exclusive request | Block fetch-invalidate |
| 0100 | EE | 11 | Write-Partial | Control register write |
| 0011 | F3 | 0C | Write-no-Snoop | Cast-out |
| 0010 | F7 | 08 | Write-Snarf | Intervention data, update memory |
| 0001 | FB | 04 | Write-Clobber | Block Write-invalidate (wr-nuke) | cntr_n[3]: data_err_n is 1 if the address is corrupt and should not be used.

For example, is set if a parity error was detected and reported earlier in the address path. If data_err_n is asserted for any cycle in a transaction, then the entire block may be bad. The master must signal an error. Slaves and snoopers may signal an error.

TABLE 7

Data Size Encodings for Partial requests

| data_addr_n[41:40] | Data Size | Address Bits Defined |
|---|---|---|
| 11 | Double word | [35:3] |
| 10 | Reserved | — |

TABLE 7-continued

| Data Size Encodings for Partial requests | | |
|---|---|---|
| data_addr_n[41:40] | Data Size | Address Bits Defined |
| 01 | Word | [35:2] |
| 00 | Byte | [35:0] |

Also during address/command cycles, src_id_n[6:0] contains the master's slot ID and module ID. For read-block response, read-partial response, read-retry response, and write-snarf transactions, dest_id_n[6:0] is valid. For invalidate, read-exclusive request, read-shared request, read-browse request, read-exclusive-IO request, partial read request, write-clobber, write-no-snoop, and partial write transactions, dest_id_n[6:0] is undriven (logical slot 0).

A data cycle is defined by data_valid_n asserted. During data cycles:

cntr_n[3:0] is xx01$_2$ cntrl_n[0]: data_valid _n is 1 cntr_n[1]: addr_valid_n is 0.

cntr_n[2]: more_data_n is 1 if there are more data cycles is the transaction.

cntr_n[2]: more_data_n is 0 if this is a last cycle of the transaction.

cntr_n[3]: data_err_n is 1 if the address is corrupt and should not be used.

If data_err_n is asserted for any data cycle in a block transaction, then the entire block may be bad. The master shall signal an error. Slaves and snoopers may signal an error.

Also during data cycles, data_addr_n[127:0] contain 8–128 valid bits of data. The field src_id_n[6:0] contains the master's slot ID and module ID. The field dest_id_n [6:0] is valid for write-snarf, read-partial response, read-retry response, and read-block response transactions and is undriven (slot 0) for write-partial, write-clobber, and write-no-snoop transactions.

Status Cycles follow address/command and data cycles. Four cycles after a master does an address/command or data cycle, the addressed slave, and possibly other modules assert one or more status_n[] lines. The module which initiated the transaction (it may no longer be the master) samples the status_n[] lines to find if the transaction has completed successfully, and other information it needs to maintain cache coherency.

The status returned four cycles after an address/command cycle indicates whether the transaction is acknowledged, whether any slave, snooper, or snarfer aborts the transaction, and any information needed regarding cache coherency. The status returned four cycles after a data cycle contains only one valid bit: ack_n indicates whether the slave accepted the data or not. All the other lines, that is, status_n[3:1], are undefined.

To acknowledge a block transfer a slave must assert ack_n during all data cycles in the block. If a slave asserts ack_n during the first cycle of a block, then negates it later in the block, it is erroneous and any module may signal an error.

Modules are required to monitor certain bus signals for errors and to signal certain classes of errors. In other cases, modules may detect and signal an error, but are not required to do so. In a preferred embodiment, all modules are required to check for the following errors cases:

Parity errors on the cntr_n[], and cntr_p lines every cycle.

Signal mis-matches on the redundant status_n[] lines every cycle.

Parity for on data_addr_n[47:0] on every address/command cycle.

For partial accesses, addressed slaves must check parity on all defined portions of data_addr_n[].

For block transfers, addressed slaves must check parity on data_addr_n[127:0].

Also, slaves and snoopers must compare the status lines with the redundant status lines on every status cycle and signal an error if the two sets of lines don't match. All modules may but or not required to check for parity on data_addr_n[127:0] on every cycle.

A master must signal an error if it sends corrupt data and asserts data_err_n. on a data cycle. A module may signal an error in the following error cases:

No module acknowledges a transaction by asserting ack_n.

A transaction contains an incorrect number of cycles.

A transaction contains an address/command cycle or idle cycle where a data cycle is expected.

A transaction cycle has both addr_valid_n and data_valid_n asserted.

A write-partial or read-partial request transaction specifies a transfer size that is reserved or is not supported by the slave.

The signal data_err_n is asserted on a data cycle.

A address/command cycle and the command code is a reserved value.

The signal src_id_n changes during a transaction.

The signal dest_id_n[] is valid and changes during a transaction.

Multiple slaves respond to one read request.

Reading or writing using an unaligned memory address may be considered an error by a higher-level specification and such a specification may specify that the error be detected and signaled. However, the R-Bus simply ignores address bits 5:0 when transferring a block of 64 bytes.

Appendix A describes the transaction types supported by the R-Bus, including a description, information about the transaction's format, address/command cycle, data cycles, status cycles, master actions, slave actions, and snooper actions. Appendix B provides timing diagrams for all R-Bus transactions.

The R-Bus architecture may support a wide range of fault resilience options, from simple reliable design, up to complete hardware fault tolerance using full hardware error detection and recovery. For simplicity, a "basic" limited fault resilience system will be described.

In a preferred embodiment, all errors or anomalous behavior is classified into one of two severity levels based on whether data integrity is compromised. The following defines the error severity levels: error notices and fatal errors.

The error notices are abnormal hardware cases that do not involve corrupt data or loss of data integrity. Error notices are used for minor errors, non-corrupt data, or errors that are not local to the sub-system. These errors are detected in hardware and in some cases hardware also has to do special handling to correct the abnormal behavior. Notice errors also trigger an interrupt so that the condition can be logged in software. Examples of error notices are correctable single bit ECC errors, R-Bus time-outs, or R-Bus protocol failures.

All of these errors are detected and serviced by hardware and the error notification is also propagated to software in the form of an interrupt so that software can log the error and possibly take further action. (An example of further software action would be if hardware detects a correctable ECC error and services the error by correcting the data but software scrubs the location to eliminate the source of the error in memory.)

Detecting a notice level error triggers the following actions: hardware takes corrective action to service the abnormal behavior; hardware assert the R-Bus signal err__int (thereby triggering a software interrupt); hardware logs the error condition in a local error status register. The distribution of the logged information is done via a serial error report.

A fatal error is signalled when hardware detects the use of corrupt data. Fatal errors are serious errors that compromise data integrity. They are errors that mean that the core sub-system can no longer be relied on to function correctly. Examples of fatal errors are un-correctable memory ECC errors, bus parity errors, and FRC (Fault Redundancy Checking) failures.

Detecting an error of Fatal severity triggers the following actions: hardware asserts the R-Bus signal err__fatal (hardware may also assert data__err for errors that are synchronous with the R-Bus transfer such as un-correctable ECC failures); detecting err__fatal asserted, all boards act to confine the corrupt data within this core sub-system by shutting down IO pathways out of the core system fast enough to prevent the core's corrupt data from being stored in the IO sub-system; and hardware logs the error condition in a local error status register. The distribution of the logged information is done via the serial error report.

In a basic system, detection of a fatal error should stop the computer from proceeding to allow software to attempt to recover and re-start the system. If restart is not advisable, then stopping the computer prevents known corrupt data from entering the IO sub-system. The following is a common fatal error sequence: the error is detected and reported, forcing the IO to shut down; the fatal error interrupt handler wakes up; if the software can localize the error and can recover, it does so and finally re-starts the IO; if the software hangs because IO is shut down or because it cannot determine the source or scope of the fault, the system will be shutdown (crash); if the system shuts-down (crashes), the error logs are read and analyzed as part of the re-boot diagnostics. Ideally either self-test diagnostics or analyses of the error can localize the failing agent so it can be disabled.

There are four signals on the backplane for error communication, two err__int signals (err__int__n and r__err__int__n) and two err__fatal signals (err__fatal__n and r__err__fatal__n). The two sets of signals are routed the same but the signals carry different information. The err__int signals are for less severe errors plus the sending of a serial error message protocol. The separate err__int signals carry different serial message streams. The err__fatal lines are simply pulsed when a fatal error is detected.

The error lines are routed on the backplane bus as shown in FIG. 6. The routing of both the err__int signals and the err__fatal signals is represented generically in terms of a generic error signal, err__sig. For a single agent board (such as a typical memory board), the err__sig and r__err__sig are driven identically. For a board with two independent agents err__sig is driven by the master M (agent-A) send logic while the checker C (agent-B) drives r__err__sig. Each error signal is logged independently to allow software a examine a complete view of the hardware failure as seen by all agents.

For R-Bus errors (parity, FRC, signal duplication) or for un-correctable ECC errors, there is a direct relationship between the assertion of data__err, err__fatal and when corrupt data is sent down the backplane, as shown in FIG. 7. Most sources of err__fatal, however, are local to a board and are not synchronized with the backplane data transfer, so it is not possible to simply state which backplane transfers are related to the error. The only errors that trigger assertion of data__err are main memory un-correctable ECC or cache parity errors. Data__err is used as a debug aid in detecting the exact cycle of corrupt data. The data__err signal is not replicated and transfers no additional information in a robust fault resilient system.

The serial error reporting network protocol enables a serial message to be sent on the R-Bus's err__int lines. The purpose of the Error Reporting Network (ERN) is to allow exact error status to be visible to software. A complete view of the error is needed for the following reasons: to determine which board has failed so it can be replaced; to allow software to maintain complete logs; as a debugging tool to localize the reason for the error quickly; to allow diagnostics and tests to determine the exact source of the problem.

The error report follows a simple time slice approach wherein each agent in the system sends up to a 256 bit serial message. Each agent sends the report in slot order, with the board in slot 0 sending the first message followed by slot 1. The message has two parts, a short field that classifies the message severity and board type followed by a larger board definable message. The longer message contains complete error status for the board.

The error reporting protocol begins with a "start bit". In the simplest case, the start bit is the first assertion of err__int, r__err__int, err__fatal, or r__err__fatal. After the start bit then there is a brief time to get the board synchronized, then the serial message starts. After the detection of the start bit the err__int and r__err__int signals change function from error notification signals to error reporting signals. For the duration of the serial report the err__int and r__err__int signals are simply data transfer lines and are not asserted if more errors are detected during a serial message. Consequently, subsequent "non-fatal" errors are masked. (The error can be counted local to the board, however, thus greatly reducing the loss of subsequent error data caused by masking during the report).

The err__fatal and r__err__fatal signals are never used for error reporting and are always asserted after an error is detected, thereby preventing a "non-fatal" error from masking a "fatal" error. If a "non-fatal" error report is being sent and during the serial report err__fatal or r__err__fatal is asserted, then the "non-fatal" message is aborted. The error report is re-started at the beginning sending data about the new fatal error that was detected. A "fatal" error report is not aborted even by a later assertion of err__fatal or r__err__fatal. A "non-fatal" error report is started with an err__int or r__err__int asserted and both err__fatal and r__err__fatal are not asserted. A "fatal" error report is started by the assertion of err__fatal or r__err__fatal.

FIG. 8 shows the relatively simple protocol of the serial message. After a start bit is detected, a few idle cycles occur to get the board state machines synchronized. The report itself is simply the concatenation of 256 bits of information generated by each board. After the start bit and waiting period, the board in slot 0 gets 256 cycles to sent its error status. The next 256 cycles are for slot 1. If a slot is empty, then nothing is sent, and there are 256 cycles of zeros. Each slot gets its turn until a specified number of time slices are done (e.g., 32, or 16 if there are 16 or fewer boards in the system. There is no hardware decoding of the serial message—the data sent is simply logged for software to decode.

Within each board's 256 bit message, the first few bits is a fixed pattern, followed by a board type field, and then the summary error field. The remainder of the message is board dependent error status. The board normally reports data such as which byte or word was in error, critical error data (such as DRAM block address), and general board status. The total report is 8196 bus cycles long (based on 32 slots each sending 256 bits after a 4 cycle start-up time.)

The error reporting logic state machines are initialized by hardware reset. The contents of the Error Reporting FIFOs are not altered on reset, allowing software (or the watchdog timer) to reset the system to a known state before software reads the Error Reporting FIFOs. On reset, the error reporting logic must not signal an error or participate in an error report until at least 8196 cycles with no error reporting lines being asserted. This restriction prevents a board coming out of reset (local reset or on-fine insertion) from mistaking a data bit in the serial stream as a start bit. Since the longest report is 8196 cycles long the after this delay the first assertion of an error reporting line is the start bit of a new error report.

FIFOs (implemented on the CPU boards, not on the memory boards) store the complete error message from each of the two err_int lines with no hardware filming. Software to is then able read the complete error report from a local FIFOs with out using the backplane bus. Since the data in the error FIFOs is straight from the error detection logic, software must check the data for errors and inconsistencies.

The FIFOs can overflow because there is a finite amount of hardware buffering. Software must therefore monitor the FIFO status registers to determine if there is a FIFO overflow. The error FIFOs can also underflow, meaning get less data in a report than expected. Underflow occurs when a notice level error report is aborted by a fatal error report, causing the critical fatal error to be loaded at the expense of losing less critical data. Also, if the FIFO contains error notice data and a new fatal error is detected, the FIFO is flushed. Finally, a hardware film may cause one of the four error reports to get corrupted, in which case underflow may occur.

Overflow and underflow can happen independently on each for the four logs. Software must count the number of bytes in the message to determine if an underflow occurred.

When a board needs to transfer information to another board, it must gain and keep exclusive control of the bus's data transfer lines for the transaction's duration. Boards compete for, acquire, hold, and relinquish that control through a process called arbitration. The following description describes in detail the R-Bus arbitration protocol that governs control of the R-Bus data transfer lines. The following concepts are the foundation of the R-Bus arbitration protocol.

The board (and module) that drives the data transfer lines in a particular bus transaction is the transaction's master. A transaction's intended recipient boards are slaves. Other boards that monitor a transaction to maintain cache coherency are snoopers. On a particular bus cycle, there can be at most one master. Arbitration selects that master.

R-Bus arbitration operates in parallel with data transform and without using the data transfer lines. Arbitration uses separate, dedicated bus lines, allowing arbitration activity to take place concurrently with transactions on the data transfer lines. R-Bus arbitration is distributed; there is no central arbiter. Instead, each board implements an identical Arbiter (or whatever subset of the Arbiter the board requires), shown in FIG. 9. The Arbiters distributed on all the boards work in concert to determine the next bus master.

The R-Bus arbitration protocol satisfies the following goals when selecting the next bus master: to ensure fair access to the R-Bus, and to maximize R-Bus bandwidth. Fair access is assured using a "round robin" arbitration layer on top of a simple prioritization. In addition to ensuring fair access to the R-Bus itself, the arbitration protocol supports mechanism to ensure access to the resources connected to the R-Bus. These mechanisms prevent cases of accesses being lock out for ever because of repeated not ready status or repeated retry responses. The arbitration protocol allows for modules to arbitrate for requests in a high priority mode, or in severe cases to lock out other requests until a successful response is received to their request.

R-Bus bandwidth is maximized by minimizing the arbitration induced idle cycles and by balancing the load between requests and responses using "ping-pong" switching between requests and responses arbitration classes. Maximizing bandwidth is furthered by requiring a lengthy delay before allowing use of performance limiting high priority mode arbitration classes.

There are three sets of R-Bus signals: arb_n[4:0]—the "competition" lines; class_n[2:0]—the class lines; and bus_busy_n, inherit_n—the bus busy lines.

The competition lines are the actual selection lines that determine the next master based on pure slot number priority of the modules competing. The class lines are used to define which arbitration classes are competing. More particularly, the class_n[] define the "round" for the round robin fairness and also can be used select which class of arbitration (resp, reql, reqh) gets to use the competition lines (arb_n[]) during the next arbitration cycle. The busy lines indicate that the R-Bus is in use and that the arbitration should be delayed. These lines inhibit the issuing of new grants.

To make it easier to describe the arbitration function there are some "meta-signals" that are used in the following description of arbitration and arbitration state machines. The internal "meta-signals" are as follows: the want lines (want_reqh, want_reql, want_resp) are asserted if the board is attempting to gain access to R-Bus; the win signal (win) is asserted when the board has competed with the other boards and this is the highest priority board; the grant lines (grant_reqh, grant_reql, grant_resp) are asserted when the board is granted R-Bus mastership for the following cycle.

Several signals within the R-Bus are logic ORed, allowing them to be driven simultaneously by several modules. When wire ORed signals are used, a phenomenon known as the "wired-OR glitch" can occur. A glitch will occur only when one module releases a signal line while one or more modules are still asserting it. This glitch will last for a round trip bus delay, doubling the bus settling time, which significantly reduces the maximum operational bus frequency. The R-Bus protocol has been designed to eliminate this glitch by placing dead cycles between any change of mastership on the bus or between wired-OR signal sequences such as arbitration and status sequences.

The arb_n[] and class_n[] lines used for arbitration are wired-OR signals. Accordingly, any competition cycle, in which the arbitration lines are used to compete between boards, is followed by at least one rest cycle, in which the arbitration lines are not driven by any board. The state diagram for the competition cycle versus rest cycle is given in FIG. 10.

When two or more boards compete in a competition cycle, the board from the highest-numbered slot always wins. The round-robin protocol then re-arbitrates with all boards that lost the competition. The round robin protocol prevents a board from competing until other boards competing in the same arbitration class have been bus masters. If a board is competing in a particular competition cycle, it drives the slot ID onto the arb_n[] lines. At the end of the competition cycle the board compares the arb_n[] versus its slot_id[]. If the board's own slot ID is returned at the end of the competition cycle then this is the highest-numbered slot competing and this slot will be granted R-Bus mastership on the next available cycle.

This competition mechanism is based on the split routing of the arb_n[] set forth previously in Table 3 above. The split routing implements a form of daisy chain where any higher numbered slot can notify all lower numbered slots that it wishes to use the bus. Selection is a pure slot_id[] based priority selection. The round robin introduces arbitration fairness.

The pattern of breaks and connections of the arb_n[] lines guarantees that if slot_id[i]=0, and a board sees arb_n[i] asserted when it is competing, for any i, then the board loses the competition. Otherwise, the board wins the competition. If a board is competing in a particular competition cycle, then it drives each arb_n[] line that corresponds to a 1 bit in its slot ID. In other words, if slot_id[i]=1, then a board drives arb_n[i] when it is competing. Because arb_n[] lines are wired-OR and driving a 0 does not alter the R-Bus signals, this scheme can be implemented by driving the slot_id[] onto the arb_n[] lines.

If a board is competing in a particular competition cycle, then it receives each arb_n[] line that corresponds to a 0 bit in its slot ID. In other words, if slot_id[i]=0, then a board receives arb_n[i] when it competing. If all the receiving arb_n[] lines are zero at the end of the competition cycle then this is the highest numbered slot competing. Checking that the zero bits in the slot_id[] are still zero on the arb_n[] is equivalent in this case to the full comparison of slot_id[] versus arb_n[] but is significantly faster to compute.

When a board wins an arbitration competition, it will be bus master and control the data transfer lines two cycles later as shown in FIG. 11, and should begin using the bus at that time. (A master may acquire or keep mastership without driving the data transfer lines immediately or at all. However, obtaining the bus without using it should be avoided, because it wastes bus bandwidth.)

To keep the bus for longer than one cycle, a master must assert bus_busy_n on the first cycle it owns the bus, as shown in FIG. 12, and keep asserting bus_busy_n through the next-to-last cycle that it owns the bus. The bus master must negate bus_busy_n on the last cycle (not including status cycles or dead cycles) that it controls the bus. A master normally relinquishes mastership at the end of each transaction—the master can arbitrate again if needs the bus again. If a master fails to assert bus_busy_n, then it is bus master for only one cycle and may only issue a one-cycle transaction.

By asserting bus_busy_n, a master may delay issuing a bus transaction, called delayed start. Since delayed start consumes bus bandwidth without transferring useful information, it is to be avoided if possible. In some instances, delayed start may be unavoidable, for example by a memory board in the relative rare case of a incoming memory write followed by an outgoing read-block response. In this case a single delay cycle is induced to allow for turn around of a internal data bus.

A master may keep bus mastership for multiple transactions, while continuously asserting bus_busy_n, called bus hogging. Since keeping mastership and preventing arbitration across multiple transactions may cause other modules to wait too long for the R-Bus, bus hogging is to be avoided if possible. FIG. 13 shows an example of bus hogging and delayed starting.

A slave may take (inherit) bus mastership from the existing master by asserting inherit_n. Only the module that is the target of the current transaction may assert inherit_n. This can only be done on block transactions that contain data (write-snarf, read-block response). After bus_busy_n is negated for two cycles then bus mastership is transferred to the previous slave device. Once the previous slave takes mastership it can keep mastership by asserting inherit_n or bus_busy_n. FIG. 14 shows an example of bus inheriting. Bus inheriting may be used by when a module wants to merge updated data into the response data and send back out the merged data. Bus inheriting prevents excessive arbitration for a single logical transfer.

A board competes for the R-Bus in some combination of three arbitration classes. These classes allow the arbitration protocol to define round robin selectively between different types of requests, and to restrict which types of transactions are competing on the arb_n[] lines during a given cycle. The classes are used to prevent arbitration lockups or arbitration starvation. The arbitration classes are as follows: class_n [0]—Response Class, Resp; class_n[1]—Request Class, Reql; and class_n[2]: High Priority Request class, Reqh.

The Response Class, Resp, is used for read-block responses, read-retry responses, read-partial responses, write-snarfs (read-block response with memory update because data dirty), write-no-snoop (cast-outs, give up cache ownership), and some write-partial transactions. The Request Class, Reql, is used for read-shared, read-browse, read-exclusive, read-exclusive-IO (read-RMW), invalidate, read-partial requests, write-clobber (write nuke), and some write-partial transactions. The High Priority Request Class, Reqh, is used by requests that are getting locked out by repeated no ready status or repeated read-retry responses. Only class_n[1] (reql) transaction can be elevated to class_n[2] (reqh).

There is a second stage of class_n[2] (reqh) when round robin is disabled and all requests stop until the class_n[2] (reqh) request gets a successful competition. This function is called "MAYDAY." In MAYDAY operation, the processor and I/O boards disregard round robin fairness when the number of retries of the outgoing requests exceeds an implementation defined threshold. This measure is taken because the request is at risk of being aborted because the number of retries. The board arbitrates in class_n[2] (reqh) using fairness and then if that fails to get a successful completion, then the board starts continuously arbitrating, re-entering all request rounds. As a result, other requestors are effectively locked out until after the long delayed request is successfully completed. MAYDAY provides for cases of limited buffering in that the continuous high priority request arbitration effectively lightens the bus utilization so the limited buffering can be freed and used for the long delayed request.

A board asserts the appropriate class_n[] line during ever competition cycle when it is attempting to get bus mastership. A board may seek bus mastership in different arbitration classes simultaneously on behalf of different pending transactions. For example, a processor board may be competing in the low-priority request class to get the bus for a memory read request, while at the same time be competing in the response class to do a write-snarf transaction after an intervention. A board must not seek bus mastership in different arbitration classes simultaneously on behalf of a single transaction. To do so is unfair competition and erroneous behavior. Boards do not need to be capable of competing in all three arbitration classes. A memory board, for example, competes only in the response class.

The R-Bus arbitration protocol is round-robin within each of the three arbitration classes. A round robin rule for allocating a resource gives all contenders in some class a turn using the resource before any contender is given another turn. Competition within a arbitration class takes place in rounds. A round begins when any board asserts a particular class_n[] signal during a competition cycle. A round ends when no board asserts that class_n[] signal during a competition cycle. For example, a response round begins when any board asserts class_n[0] (resp_n) during a competition cycle and ends when no board asserts class_n[0] (resp_n) during a competition cycle. A new round cannot begin until after the previous round has ended. Rounds may be simultaneously taking place in all three arbitration classes.

The round robin protocol ensures fair and equitable allocation of the bus to competing boards by allowing all boards competing in a arbitration class a turn at bus mastership. The basic round robin rule is that once a board has acquired the bus it may not enter competition again until all other boards competing in the same arbitration class have also had a turn at bus mastership.

New competitors may enter a round already in progress and existing competitors may leave a round in progress. However, once a board has been bus master once in a round, that board may not compete again in that arbitration class until the next round in that class begins.

There are cases when a board is decreasing system level performance because the round robin restricts access to a critical resource. In this case the round robin fairness can be disabled. For example, a memory board might disregard round robin fairness when the number of incoming requests exceeds the amount of buffering and responses cannot be sent because the memory board is waiting for the round robin fairness round to complete. In this case the memory board may choose to reenter a round in progress. The threshold for re-entering the round is implementation defined.

The class_n[] lines are used to restrict the competitors in a given competition cycle. This allows a sub-set of the total number of module wanting the bus to use the arb_n[] lines to compete. This mechanism is not used in light bus utilization when the arb_n[] lines are not restricted, and any module that can compete. The following rules govern what boards compete in the next competition cycle:

1. If zero or one class_n[] lines is asserted, then all classes may compete in the next competition cycle. (This is the dominate case in a lightly loaded R-Bus.)
2. If two or three class_n[] lines are asserted including class_n[0] (resp_n) and the last competition cycle was not limited to responses, then only responses can compete in the next competition cycle.
3. If two or three class_n[] lines are asserted including class_n[0] (resp_n) and only responses competed in the last competition cycle, then only high-priority requests (if class_n[2] asserted) or only low-priority requests (if class_n[1] (reql_n) asserted and class_n[2] not asserted) can compete in the next competition cycle.
4. If both class_n[2] (reqh_n) and class_n[1] (reql_n) are asserted and class_$n_l$0] (resp_n) is not asserted, then only high-priority requests can compete in the next competition cycle.

These rules are summarized in Table 8 and illustrated in state diagram form in The rules give responses priority over either request class unless the last competition cycle was limited to responses. This property assures orderly interleaving of requests and responses in heavy bus traffic.

Between the request classes, the high-priority class is always given priority over the low-priority class, as one would expect from their names. The "any" class is an optimization that speeds up access to the bus when there is little contention between different classes, when zero or one classes are now requesting the bus "Any" is not used with the high-priority class because the urgency of high-priority requests makes competition between such requests and low-priority requests undesirable.

TABLE 8

| | Arbitration Protocol's Class Function | | | |
|---|---|---|---|---|
| class_n[2] (reqh_n) | class_n[1] (reql_n) | class_n[0] (resp_n) | Last Class | Next Class |
| 0 | 0 | 0 | X (don't care) | ANY |
| 0 | 0 | 1 | X | ANY |
| 0 | 1 | 0 | X | ANY |
| 0 | 1 | 1 | RESP | REQL |
| 0 | 1 | 1 | not RESP | RESP |
| 1 | X | 0 | X | REQH |
| 1 | X | 1 | RESP | REQH |
| 1 | X | 1 | not RESP | RESP |

The layering of the round robin fairness and the arbitration class restriction combine to produce a competition state machine that controls when a module can compete on the arb_n[] to select the next bus master. The competition state machine is shown in FIG. 16. Three identical state machine govern competition in the three respective classes. The states are: IDLE; NOT COMPETING; COMPETE; CHAMP; AND RETIRED.

In the IDLE state, the board is not competing in this cycle and has not competed in this round. In the NOT COMPETING state, the board is not competing in this competition cycle because the class restricted this class out. The board leaves the IDLE state and enters the COMPETE state on a lag cycle if the board wants the bus in this class and the class state machine's output indicates that this arbitration class competes next.

In the COMPETE state, a board competes with other boards for the bus. If the arb_n[] to slot_id[] comparison indicates that the board won, then the board enters either the CHAMP state (if bus_busy_n is asserted) or the RETIRED state (otherwise). If the board lost and if its class is still enabled, it may remain in the COMPETE state. If the round's class is not enabled, then the board enters to the not competing state.

In the CHAMP state, a board is the next bus master. If bus_busy_n is asserted, then the board remains in the CHAMP state, otherwise, the board enters the RETIRED state and begins using the bus.

In the RETIRED state, the board is the bus master or has retired and is waiting for the round to end. The board begins its stay in the RETIRED state by using the bus. If the board will use the bus for longer than one cycle, it asserts bus_busy_n on all but the last cycle of the transaction. Even after relinquishing the bus, the board stays in the RETIRED state until a lag cycle when no board is asserting the round's class_n[] line, which indicates the end of the round. If the conditions for entering the COMPETE state are also met, then the board may go from RETIRED directly to COMPETE. Otherwise, the board enters the IDLE state.

Each module that can act as a R-Bus master may maintain one or more arbitration time-out counters. If the counter is enabled, it shall count the number of bus cycles between the cycle when the module requests the R-Bus in a particular arbitration class and the cycle when the module is granted the R-Bus. If an arbitration time-out counter exceeds an implementation defined threshold, then the module may signal an error. The module may abort the request or may continue to arbitrate.

To facilitate a full and complete understanding of the R-Bus arbitration protocol, timing diagrams of additional arbitration examples are presented in FIG. 17 through FIG. 20.

As may be appreciated from the foregoing description, there has been described a high-reliability SMP backplane bus that is simpler than but offers comparable performance to existing buses. The high-reliability bus eliminates the potential for single undetected points of failure by replicating signal lines that cannot be checked by parity. The simplicity of the bus arbitration and transaction protocols affords the ability to provide replicate signals without increasing the number of total bus lines beyond that of comparable buses.

It will further be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

Appendix A: Transaction Descriptions

This Appendix describes the 13 transaction types supported by the R-Bus.

For each transaction type, this Appendix provides a description, information about the transaction's format, address/command cycle, data cycles, status cycles, master actions, slave actions, and snooper actions.

A.1 Write-Partial

Description: Writes 1, 4, or 8 bytes[1] to a register or uncacheable memory address.

A write-partial transaction contains one address/command cycle immediately followed by one data cycle, as shown in Figure 1-3.

A/C Cycle: The following table describes the address/command cycle:

| Signals | Value | Meaning |
|---|---|---|
| data_addr_n[127:46] | u | Undefined. |
| data_addr_n[45:42] | $0100_2$ | write-partial command. |
| data_addr_n[41:40] | size | Transfer size of $2^N$ bytes per Table 1-4.[1] |
| data_addr_n[39:36] | u | Undefined. |
| data_addr_n[35:N] | addr | Address's most significant bits. |
| data_addr_n[N-1:0] | u | Undefined. |
| src_id_n[6:0] | source | Master's slot ID and module ID. |
| dest_id_n[6:0] | 0 | Undriven |
| cntrl_n[3] | 0 | data_err_n is 0 if address is valid, and 1 if address is erroneous. |
| cntrl_n[2:0] | $110_2$ | data_valid_n is 0, addr_valid_n is 1, more_data_n is 1. |

---

[1]. Current R-Bus boards treat all partial accesses as 4 byte accesses. Size is a don't care field.

Data Cycle: The following table describes the data cycle:

| Signals | Value | Meaning |
|---|---|---|
| data_addr_n[127:0] | data | 1, 4, or 8 bytes, aligned per Table 1-5. Unused data_addr_n[ ] lines are undefined. |
| src_id_n[6:0] | source | Master's slot ID and module ID. |
| dest_id_n[6:0] | 0 | Undriven |
| cntrl_n[3] | 0 | data_err_n is 0 if data is valid, and 1 if data is erroneous. |
| cntrl_n[2] | 0 | more_data_n is 0, last cycle. |
| cntrl_n[1:0] | $01_2$ | data_valid_n is 1, addr_valid_n is 0 |

Status Cycles: A write-partial transaction includes two status cycles, four cycles after the address/command cycle and the data cycle respectively. The following table lists the possible status results for a write-partial transaction.

| status_n[ ] 3 | 2 | 1 | 0 | Meaning for write-partial | Master Reaction | Slave Reaction |
|---|---|---|---|---|---|---|
| x | x | x | 0 | No acknowledgment (all cycles) | Abort, may error | Ignore |
| x | x | 1 | 1 | Slave is not ready (first cycle only) | Retry later, keep retry count | Likely Ignore May do write anyway |
| x | x | 0 | 1 | Transaction OK (first cycle) | Done | Do write |
| x | x | x | 1 | Transaction OK (second cycle) | Done | Latch data |

Master: board or module should properly handle a write-partial transaction in which it is both master and slave. Such an operation may use the R-Bus or be performed independent of the R-Bus.

Slaves: If the transaction is not a multicast or broadcast, at most one slave shall participate. If the transaction is a multicast or broadcast, then multiple slaves may participate.

If address matches the slave's address range and there is a register or an uncacheable memory location at the specified address, then the slave shall assert ack_n on both status cycles.

A slave shall not assert ack_n if there is not a register or an uncacheable memory location at the specified address. If the write-partial transaction is not a broadcast write, then the slave may signal an error.

A slave shall assert not_ready_n with ack_n in the first status cycle if the slave is temporarily unable to perform the write operation. Even if the received status includes not_ready_n and ack_n asserted, slaves may perform the write operation.

A slave may not perform the write and may signal an error in the following cases:

- The transfer size specified in the address/command cycle does not match the size of the addressed register, is a reserved encoding in Table 3-3, or is a size not supported by the module.
- data_err_n is asserted on the data cycle, indicating that the data contains errors.

Snoopers: Write-partial transactions are not snooped.

A.2 Write-Clobber

Description: Writes a block to memory and invalidates any copies of the block cached by other modules.

A write-clobber transaction contains one address/command cycle immediately followed by 4 data cycles. Figure 1-2 shows the bus sequence.

A/C Cycle: The following table describes the address/command cycle:

| Signals | Value | Meaning |
|---|---|---|
| data_addr_n[127:46] | u | Undefined. |
| data_addr_n[45:42] | $0001_2$ | write-clobber command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $110_2$ | data_valid_n is 0, addr_valid_n is 1, more_data_n is 1. |

Data Cycles: The following table describes each data cycle:

| Signals | Value | Meaning |
|---|---|---|
| data_addr_n[127:0] | data | 16 bytes of data. |
| src_id_n[6:0] | source | Master's slot ID and module ID. |
| dest_id_n[6:0] | 0 | Undriven. |
| cntrl_n[3] | 0 | data_err_n normally 0. 1 if the data contains errors, else 0. |
| cntrl_n[2] | 1,1,1,0 | more_data_n is 1 on all but last cycle when it is 0. |
| cntrl_n[1:0] | $01_2$ | data_valid_n is 1, addr_valid_n is 0. |

If B is the block address, then the first data cycle transfers the bytes at addresses B to B+15, the second data cycle transfers the bytes at addresses B+16 to B+31, and so on.

Status Cycles: A write-clobber transaction includes status cycles four cycles after the address/command cycle and four cycles after each data cycle. The following table lists the possible status results for a write-clobber transaction.

| status_n[ ] | | | | Meaning for write-clobber | Master Reaction | Slave Reaction |
|---|---|---|---|---|---|---|
| 3 | 2 | 1 | 0 | | | |
| x | x | x | 0 | No acknowledgment (all cycles) | Abort, may error | Ignore |
| x | x | 1 | 1 | Slave is not ready (first cycle only) | Retry later, keep retry count | Likely Ignore May do write anyway |
| x | x | 0 | 1 | Transaction OK (first cycle) | Done | Do write |
| x | x | x | 1 | Transaction OK (second cycle) | Done | Latch data |

Master: status_n[ ] indicates that the transaction is unsuccessful.

Slaves: A slave shall assert ack_n on all status cycles if the slave contains a cacheable memory block at the specified address.

A slave shall not assert ack_n and shall not accept the block if the slave does not contain a cacheable memory block at the specified address. If the address falls in a range used for registers or non-cacheable memory, then the slave may signal an error.

A slave shall assert not_ready_n with ack_n in the first status cycle if it is temporarily unable to perform the write operation. Even if the received status includes not_ready_n and ack_n asserted, slaves may perform the write operation.

If data_err_n is asserted on any data cycle, then a slave may not accept the block and may signal an error.

Snoopers: All caching modules on the R-Bus, other than the master, shall snoop write-clobber transactions or assert not_ready_n in the first status cycle if unable to snoop. A snooper shall not assert ack_n in any status cycle.

If the snooper's cache contains the block, the block shall be invalidated regardless of whether it is clean or dirty and may be invalidated regardless of transaction status.

A.3 Write-No-Snoop

Description: Writes a block to memory without snooping.

A write-no-snoop transaction may be used to write a cacheable block that is in the exclusive or dirty state and therefore not contained in any other module's cache. A write-snoop transaction may also be used for block transfers to memory-mapped I/O devices or to non-cacheable memory Using write-no-snoop to write a cacheable memory block in the invalid or shared states is erroneous, because such a block may be contained in other caches.

A write-no-snoop transaction contains one address/command cycle immediately followed by 4 data cycles. Figure 1-2 shows the bus sequence.

A/C Cycle: The following table describes the address/command cycle:

| Signals | Value | Meaning |
|---|---|---|
| data_addr_n[127:46] | u | Undefined. |
| data_addr_n[45:42] | $0011_2$ | write-no-snoop command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $110_2$ | data_valid_n is 0, addr_valid_n is 1, more_data_n is 1. |

Data Cycles: The following table describes each data cycle:

| Signals | Value | Meaning |
|---|---|---|
| data_addr_n[127:0] | data | 16 bytes of data. |
| src_id_n[6:0] | source | Master's slot ID and module ID. |
| dest_id_n[6:0] | 0 | Undriven. |
| cntrl_n[3] | 0 | data_err_n normally 0. 1 if the data contains errors, else 0. |
| cntrl_n[2] | 1,1,1,0 | more_data_n is 1 on all but last cycle when it is 0. |
| cntrl_n[1:0] | $01_2$ | data_valid_n is 1, addr_valid_n is 0. |

If B is the block address, then the first data cycle transfers the bytes at addresses B to B+15, the second data cycle transfers the bytes at addresses B+16 to B+31, and so on.

Status Cycles: A write-no-snoop transaction includes status cycles four cycles after the address/command cycle and four cycles after each data cycle. The following table lists the possible status results for a write-no-snoop transaction.

| status_n[ ] | | | | Meaning for write-no-snoop | Master Reaction | Slave Reaction |
|---|---|---|---|---|---|---|
| 3 | 2 | 1 | 0 | | | |
| x | x | x | 0 | No acknowledgment (all cycles) | Abort, may error | Ignore |
| x | x | 1 | 1 | Slave is not ready (first cycle only) | Retry later, keep retry count | Likely Ignore May do write anyway |
| x | x | 0 | 1 | Transaction OK (first cycle) | Done | Do write |
| x | x | x | 1 | Transaction OK (second cycle) | Done | Latch data |

Master: status_n[ ] indicates that the transaction is unsuccessful.

Slaves: A slave shall assert ack_n on all status cycles if the slave contains a memory block at the specified address.

A slave shall not assert ack_n and shall not accept the block if the slave does not contain a memory block at the specified address. If the address falls in a range used for registers, then the slave may signal an error.

A slave shall assert not_ready_n with ack_n in the first status cycle if it is temporarily unable to perform the write operation. Even if the received status includes not_ready_n and ack_n asserted, slaves may perform the write operation.

If data_err_n is asserted on any data cycle, then a slave may not accept the block and may signal an error.

Snoopers: Write-no-snoop transactions are not snooped.

A.4 Write-Snarf

Description: Writes a dirty block to memory and to a snarfing module, in response to a previous read-block request (read-shared request, read-exclusive request, read-browse request, or read-exclusive-IO request) that this transaction's master intervened in. (If the master intervened and the block is clean, then the master responds with a read-block response transaction instead.)

A write-snarf transaction contains one address/command cycle immediately followed by 4 data cycles. Figure 1-2 shows the bus sequence.

A/C Cycle: The following table describes the address/command cycle:

| Signals | Value | Meaning |
|---|---|---|
| data_addr_n[127:46] | u | Undefined. |
| data_addr_n[45:42] | $0010_2$ | write-snarf command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | snarf | Snarfing module's slot ID and module ID. |
| cntrl_n[3] | 0 | data_err_n is 0 if address is valid, and 1 if address is erroneous. |
| cntrl_n[2:0] | $110_2$ | data_valid_n is 0, addr_valid_n is 1, more_data_n is 1. |

Data Cycles: The following table describes each data cycle:

| Signals | Value | Meaning |
|---|---|---|
| data_addr_n[127:0] | data | 16 bytes of data. |
| src_id_n[6:0] | source | Master's slot ID and module ID. |
| dest_id_n[6:0] | snarf | Snarfing module's slot ID and module ID. |
| cntrl_n[3] | 0 | data_err_n normally 0. 1 if the data contains errors, else 0. |
| cntrl_n[2] | 1,1,1,0 | more_data_n is 1 on all but last cycle when it is 0. |
| cntrl_n[1:0] | $01_2$ | data_valid_n is 1, addr_valid_n is 0. |

If B is the block address, then the first data cycle transfers the bytes at addresses B to B+15, the second data cycle transfers the bytes at addresses B+16 to B+31, and so on.

Status Cycles: A write-snarf transaction includes status cycles four cycles after the address/command cycle and four cycles after each data cycle. The following table lists the possible status results for a write-snarf transaction.

| status_n[ ] | | | | Meaning for write-snarf | Master Reaction | Slave Reaction |
|---|---|---|---|---|---|---|
| 3 | 2 | 1 | 0 | | | |
| x | x | x | 0 | No acknowledgment (all cycles), Error | Abort, error | Ignore |
| x | x | 1 | 1 | Slave is not ready (first cycle only) | Retry later, keep retry count | Likely Ignore May do write anyway |
| x | x | 0 | 1 | Transaction OK (first cycle) | Done | Do write |
| x | x | x | 1 | Transaction OK (second cycle) | Done | Latch data |

Master (intervening agent):
status_n[ ] indicates that the transaction is unsuccessful.

Memory Slaves:
A memory module shall assert ack_n on all status cycles if the module contains a cacheable memory block at the specified address.

A memory module shall not assert ack_n and shall not accept the block if the module does not contain a cacheable memory block at the specified address. If the address falls in a range used for registers or non-cacheable memory, then the slave may signal an error.

A memory module shall assert not_ready_n with ack_n in the first status cycle if it is temporarily unable to perform the write operation. Even if the received status includes not_ready_n and ack_n asserted, slaves may perform the write operation.

If data_err_n is asserted on any data cycle, then a memory module may not accept the block and may signal an error.

Snarfer Slave (requestor):
The snarfer is uniquely identified by dest_id_n[ ]. There is one and only one snarfer.

If the snarfer has not issued a read-block request, or intervention did not occur, or a response was already received, then the snarfer may signal an error.

The snarfer shall not assert ack_n. Acknowledging the transaction is done by the memory slave.

If data_err_n is asserted on any data cycle, then a snarfer may not accept the block and may signal an error.

Snoopers: Write-snarf transactions are not snooped.

A.5 Read-Partial Request

Description: Requests 1, 4, or 8 bytes[1] from a register or uncachable memory address in a particular slave module.

A read-partial request contains one address/command cycle as shown in Figure 1-4.

A read-partial request is half of a split operation. The request may be answered with a read-partial response or a read-retry response.

A/C Cycle: The following table describes the address/command cycle:

| Signals | Value | Meaning |
|---|---|---|
| data_addr_n[127:46] | u | Undefined. |
| data_addr_n[45:42] | $1100_2$ | read-partial request command. |
| data_addr_n[41:40] | size | Transfer size of $2^N$ bytes per Table 1-4.[1] |
| data_addr_n[39:36] | u | Undefined. |
| data_addr_n[35:N] | addr | Address's most significant bits. |
| data_addr_n[N-1:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: A read-partial request includes one status cycle, four cycles after the address/command cycle. The following table lists the possible status results for a read-partial request.

| status_n[ ] | | | | Meaning for read-partial | Master Reaction | Slave Reaction |
|---|---|---|---|---|---|---|
| 3 | 2 | 1 | 0 | | | |
| x | x | x | 0 | No acknowledgment | Abort, may error | Ignore |
| x | x | 1 | 1 | Slave is not ready | Retry later, keep retry count | Ignore, May do read anyway but no R-Bus response. |
| x | x | 0 | 1 | Transaction OK | Wait for response Keep response time-out | Do read and generate response |

Master: A board or module should properly handle a read-partial request or read-partial response transaction in which it is both master and slave. Such an operation may use the R-Bus or be performed independent of the R-Bus.

Slave: A read-partial request is addressed to the one slave specified by data_addr_n[ ]. If data_addr_n[ ] specifies a multicast or broadcast ID, then a read-partial request is erroneous and any module may signal an error.

---

1. Current R-Bus boards treat all partial accesses as 4 byte accesses. Size is a don't care field.

A slave shall assert ack_n on the status cycle if data_addr_n[ ] is the slave's module ID and there is a register or an uncacheable memory location at the specified address.

A slave shall not assert ack_n if there is not a register or uncacheable memory location at the specified address. The slave may signal an error.

A slave shall assert not_ready_n with ack_n on the status cycle if the slave is temporarily unable to perform the read operation.

A slave may not perform the read and may signal an error if the transfer size specified in the address/command cycle does not match the size of the addressed register, is a reserved encoding in Table 3-3, or is a size not supported by the module.

Snoopers: Read-partial requests are not snooped.

A.6 Read-Shared Request

Description: Requests a block from memory and places the block in the shared state, allowing multiple clean copies to exist in different caches.

A read-shared request contains one address/command cycle, as shown in Figure 1-4.

A read-shared request is half of a split operation. The request may be answered with one of the following response transactions:

- A read-block response from memory
- Read-retry response from memory
- Read-block response from an intervening cache
- Write-snarf from an intervening cache A/C Cycle: The following table describes the address/command cycle:

| Signals | Value | Meaning |
|---|---|---|
| data_addr_n[127:46] | u | Undefined. |
| data_addr_n[45:42] | $1010_2$ | read-shared request command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: A read-shared request includes one status cycle, four cycles after the address/command cycle. The following table lists the possible status results for a read-shared request.

Master: Slaves: A slave shall assert ack_n on the status cycle if the slave contains a memory block at the specified address.

A slave shall assert not_ready_n with ack_n on the status cycle if the slave is temporarily unable to perform the read operation. If the received status includes

| status_n 3 2 1 0 | Meaning for read-shared request | Master Reaction | Memory Slave Reaction | Snoopers Reaction (block is cached) |
|---|---|---|---|---|
| x x x 0 | No acknowledgment | Abort, may error | Ignore | May Ignore |
| x x 1 1 | Not ready | Retry later, keep retry count | Likely Ignore May do read anyway but no R-Bus response. | Likely Ignore Shall not change cache state. |
| 0 0 0 1 | Transaction OK. Non-shared data from memory | Wait for response Keep response time-out | Do read and generate read-block response. | Ignore. Not in cache. |
| 0 1 0 1 | Transaction OK. Shared data from memory | Wait for response Keep response time-out | Do read and generate read-block response. | Change to shared state. If not in cache, ignore. |
| 1 0 0 1 | Transaction OK. Non-shared data from intervening cache | Wait for response Keep response time-out | Likely Ignore May do read anyway but no R-Bus response. | If cached excl. or mod. (asserted intervene_n) Do intervention and Change to shared state. |
| 1 1 0 1 | Transaction OK. Shared data from intervening cache | Wait for response Keep response time-out | Likely Ignore May do read anyway but no R-Bus response. | If cached excl. or mod. (asserted intervene_n) Do intervention and Change to shared state. | not_ready_n and ack_n asserted in the first status cycle, then no slave shall issue a response transaction.

If the memory block's address falls in an address range used for registers and not memory, then the addressed slave shall not acknowledge the transaction nor issue a response transaction. The slave may signal an error.

If the received transaction status is $1x01_2$ (transaction OK with intervention), then the slave shall not issue a response transaction. Responding becomes the intervener's responsibility.

Snoopers: All caching modules on the R-Bus, shall snoop read-shared requests or assert not_ready_n in the status cycle if temporarily unable to snoop or temporarily unable perform the required intervention or state change operation. The snooper shall not assert ack_n. Acknowledging the transaction is done by the memory slave.

A snooper shall assert intervene_n (status_n[3]) if the snooper's cache contains the addressed block in the dirty state and may assert this signal if the cache contains the block in the exclusive state. In these states, the block cannot be in other caches, thus at most one snooper can intervene.

A snooper shall assert shared_n (status_n[2]) if the snooper's cache contains the addressed block and intends to keep the block is clean state. If the block is in the shared state, then multiple snoopers may assert shared_n. If the block is in the exclusive state, then one snooper asserts shared_n and may also assert intervene_n.

$_2$ (transaction OK with intervention), then the intervening snooper shall respond with a read-block response transaction (if the block is clean) or a write-snarf transaction (if the block is dirty). The intervening snooper may either invalidate the block in its cache or retain the block in the shared state.

A snooper that does not intervene does not change its cached state. Its only action is to assert shared_n if its cache contains the block.

A.7 Read-Browse Request

Description: Requests a block from memory and does not change the cache state of the block. This is used for an IO module's read of data for sending out of the system.

A read-browse request contains one address/command cycle, as shown in Figure 1-4.

A read-browse request is half of a split operation. The request may be answered with one of the following response transactions:

- A read-block response from memory
- Read-retry response from memory
- Read-block response from an intervening cache
- Write-snarf from an intervening cache

A/C Cycle: The following table describes the address/command cycle:

| Signals | Value | Meaning |
|---|---|---|
| data_addr_n[127:46] | u | Undefined. |
| data_addr_n[45:42] | $1011_2$ | read-browse request command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: A read-browse request includes one status cycle, four cycles after the address/command cycle. The following table lists the possible status results for a read-browse request.

Master: Slaves: If more than one slave recognizes the memory block address and responds on the status cycle or with a response transaction, then the read operation is erroneous.

A slave shall assert ack_n on the status cycle if the slave contains a memory block at the specified address.

A slave shall assert not_ready_n with ack_n on the status cycle if the slave is temporarily unable to perform the read operation. If the received status includes not_ready_n and ack_n asserted in the first status cycle, then no slave shall issue a response transaction.

If the received transaction status is $1x01_2$ (transaction OK with intervention), then the slave shall not issue a response transaction. Responding becomes the intervener's responsibility.

Snoopers: All caching modules on the R-Bus, shall snoop read-browse requests or assert not_ready_n in the status cycle if temporarily unable to snoop or temporarily unable

| status_n  3 2 1 0 | Meaning for read-browse request | Master Reaction | Memory Slave Reaction | Snoopers Reaction (block is cached) |
|---|---|---|---|---|
| x x x 0 | No acknowledgment | Abort, may error | Ignore | May Ignore |
| x x 1 1 | Not ready | Retry later, keep retry count | Likely Ignore May do read anyway but no R-Bus response. | Likely Ignore May not change cache state. |
| 0 0 0 1 | Transaction OK. Non-shared data from memory | Wait for response Keep response time-out | Do read and generate read-block response. | Ignore Not in cache. |
| 0 1 0 1 | Transaction OK. Shared data from memory | Wait for response Keep response time-out | Do read and generate read-block response. | Likely Ignore, May change to shared state. |
| 1 0 0 1 | Transaction OK. Non-shared data from intervening cache | Wait for response Keep response time-out | Likely Ignore May do read anyway but no R-Bus response. | If cached excl. or mod. (asserted intervene_n) Do intervention and may change to shared state. |
| 1 1 0 1 | Transaction OK. Shared data from intervening cache | Wait for response Keep response time-out | Likely Ignore May do read anyway but no R-Bus response. | If cached excl. or mod. (asserted intervene_n) Do intervention and may change to shared state. | perform the required intervention or state change operation. The snooper shall not assert ack_n. Acknowledging the transaction is done by the memory slave.

A snooper shall assert intervene_n (status_n[3]) if the snooper's cache contains the addressed block in the dirty state and may assert this signal if the cache contains the block in the exclusive state. In these states, the block cannot be in other caches, thus at most one snooper can intervene.

A snooper shall assert shared_n (status_n[2]) if the snooper's cache contains the addressed block and the block is clean, in the shared or exclusive states. If the block is in the shared state, then multiple snoopers may assert shared_n. If the block is in the exclusive state, then one snooper asserts shared_n and may also assert intervene_n.

2 (transaction OK with intervention), then the intervening snooper shall respond with a either a read-block response transaction or a write-snarf transaction. Which response transaction is deteremined by the intervening module.. The intervening snooper may either invalidate the block in its cache or <u>retain the block unchanged</u> in the shared, exclusive, or modified states.

A snooper that does not intervene does not change its cached state. Its only action is to assert shared_n if its cache contains the block.

A.8 Read-Exclusive Request

Description: Requests a block from memory for the master's exclusive use and invalidates the block in all other caches.

A read-exclusive request contains one address/command cycle, as shown in Figure 1-4.

A read-exclusive request is half of a split operation. The request may be answered with one of the following response transactions:

- A read-block response from memory
- Read-retry response from memory
- Read-block response from an intervening cache
- Write-snarf from an intervening cache A/C Cycle: The following table describes the address/command cycle:

| Signals | Value | Meaning |
|---|---|---|
| data_addr_n[127:46] | u | Undefined. |
| data_addr_n[45:42] | $1000_2$ | read-exclusive request command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: A read-exclusive request includes one status cycle, four cycles after the address/command cycle. The following table lists the possible status results for a read-exclusive request.

| status_n 3 2 1 0 | Meaning for read-exclusive request | Master Reaction | Memory Slave Reaction | Snoopers Reaction (block is cached) |
|---|---|---|---|---|
| x x x 0 | No acknowledgment | Abort, may error | Ignore | May Ignore |
| x x 1 1 | Not ready | Retry later, keep retry count | Likely Ignore May do read anyway but no R-Bus response. | Likely Ignore May not change cache state. |
| 0 x 0 1 | Transaction OK. Non-shared data from memory | Wait for response Keep response time-out | Do read and generate read-block response. | If cached change to invalid state. |
| 1 x 0 1 | Transaction OK. Shared data from intervening cache | Wait for response Keep response time-out | Likely Ignore May do read anyway but no R-Bus response. | If cached excl. or mod. (asserted intervene_n) Do intervention and change to invalid state. |

Master: Slaves: If more than one slave recognizes the memory block address and responds on the status cycle or with a response transaction, then the read operation is erroneous.

A slave shall assert ack_n on the status cycle if the slave contains a memory block at the specified address.

A slave shall assert not_ready_n with ack_n on the status cycle if the slave is temporarily unable to perform the read operation. If the received transaction status includes not_ready_n and ack_n asserted in the first status cycle, then no slave shall issue a response transaction.

If the received transaction status is $1x01_2$ (transaction OK with intervention), then the slave shall not issue a response transaction. Responding becomes the intervener's responsibility.

Snoopers: All caching modules on the R-Bus, other than the master, shall snoop read-exclusive requests or assert not_ready_n on the status cycle if temporarily unable to snoop or temporarily unable perform the required intervention or state change operation. A snooper shall not assert ack_n on the status cycle. Acknowledging is done by any slaves.

A snooper shall assert intervene_n (status_n[3]) if the snooper's cache contains the addressed block in the dirty state and may assert this signal if the cache contains the block in the exclusive state. In these states, the block cannot be in other caches, thus at most one snooper can intervene.

A snooper shall not assert shared_n (status_n[2]) when snooping a read-exclusive request.

If the received transaction status is $xx11_2$ (not ready), then a snooper shall not change its cache state and shall not issue any response transaction.

If the received transaction status is $1x01_2$ (transaction OK with intervention), then the intervening snooper shall respond with a read-block response transaction (if the block is clean) or a write-snarf transaction (if the block is dirty). After the responding transaction succeeds, the intervening snooper shall invalidate the block in its cache.

If the received transaction status is $xx01_2$ (transaction OK), then a snooper that does not intervene shall invalidate the block in its cache.

A.9 Read-Exclusive-IO Request

Description: Requests a block from memory for the master's exclusive use and invalidates the block in all other caches. A read-exclusive-IO is identical to a read-exclusive. By convention a read-exclusive-IO is issued by IO modules when doing merge operation. (A read-exclusive is issued by CPUs).

A read-exclusive-IO request contains one address/command cycle, as shown in Figure 1-4.

A read-exclusive-IO request is half of a split operation. The request may be answered with one of the following response transactions:

- A read-block response from memory
- Read-retry response from memory
- Read-block response from an intervening cache
- Write-snarf from an intervening cache

A/C Cycle: The following table describes the address/command cycle:

| Signals | Value | Meaning |
|---|---|---|
| data_addr_n[127:46] | u | Undefined. |
| data_addr_n[45:42] | $1001_2$ | read-exclusive-IO request command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: A read-exclusive-IO request includes one status cycle, four cycles after the address/command cycle. The following table lists the possible status results for a read-exclusive-IO request.

| status_n 3 2 1 0 | Meaning for read-exclusive-IO request | Master Reaction | Memory Slave Reaction | Snoopers Reaction (block is cached) |
|---|---|---|---|---|
| x x x 0 | No acknowledgment | Abort, may error | Ignore | May Ignore |
| x x 1 1 | Not ready | Retry later, keep retry count | Likely Ignore May do read anyway but no R-Bus response. | Likely Ignore May not change cache state. |
| 0 x 0 1 | Transaction OK. Non-shared data from memory | Wait for response Keep response time-out | Do read and generate read-block response. | If cached change to invalid state. |
| 1 x 0 1 | Transaction OK. Shared data from intervening cache | Wait for response Keep response time-out | Likely Ignore May do read anyway but no R-Bus response. | If cached excl. or mod. (asserted intervene_n) Do intervention and change to invalid state. |

Master: Slaves: If more than one slave recognizes the memory block address and responds on the status cycle or with a response transaction, then the read operation is erroneous.

A slave shall assert ack_n on the status cycle if the slave contains a memory block at the specified address.

A slave shall assert not_ready_n with ack_n on the status cycle if the slave is temporarily unable to perform the read operation. If the received transaction status includes not_ready_n and ack_n asserted in the first status cycle, then no slave shall issue a response transaction.

If the received transaction status is $1x01_2$ (transaction OK with intervention), then the slave shall not issue a response transaction. Responding becomes the intervener's responsibility.

Snoopers: All caching modules on the R-Bus, other than the master, shall snoop read-exclusive-IO requests or assert not_ready_n on the status cycle if temporarily unable to snoop or temporarily unable perform the required intervention or state change operation. A snooper shall not assert ack_n on the status cycle. Acknowledging is done by any slaves.

A snooper shall assert intervene_n (status_n[3]) if the snooper's cache contains the addressed block in the dirty state and may assert this signal if the cache contains the block in the exclusive state. In these states, the block cannot be in other caches, thus at most one snooper can intervene.

A snooper shall not assert shared_n (status_n[2]) when snooping a read-exclusive-IO request.

If the received transaction status is $xx11_2$ (not ready), then a snooper shall not change its cache state and shall not issue any response transaction.

If the received transaction status is $1x01_2$ (transaction OK with intervention), then the intervening snooper shall respond with a read-block response transaction (if the block is clean) or a write-snarf transaction (if the block is dirty). After the responding transaction succeeds, the intervening snooper shall invalidate the block in its cache.

If the received transaction status is $xx01_2$ (transaction OK), then a snooper that does not intervene shall invalidate the block in its cache.

A.10 Read-Partial Response

Description: Sends 1, 4, or 8 bytes of data requested by a previous read-partial request.

A read-partial response contains one data cycle, as shown in Figure 1-6.

Data Cycle: The following table describes the data cycle:

| Signals | Value | Meaning |
|---|---|---|
| data_addr_n[127:0] | data | 1, 4, or 8 bytes, aligned per Table 1-5. Unused data_addr_n[ ] lines are undefined. |
| src_id_n[6:0] | source | Master's slot ID and module ID. |
| dest_id_n[6:0] | dest. | Requester's slot ID and module ID. |
| cntrl_n[3] | 0 | 1 if the data contains errors, else 0. |
| cntrl_n[2:0] | $001_2$ | data_valid_n is 1, addr_valid_n is 0, more_data_n is 0. |

Status Cycle: There is one status cycle, valid four cycles after the data cycle. The following table lists the possible status results.

| status_n[ ] | | | | Meaning for read-partial response | Master Reaction | Slave Reaction |
|---|---|---|---|---|---|---|
| 3 | 2 | 1 | 0 | | | |
| x | x | x | 0 | No acknowledgment, Error | Abort, error | Ignore |
| x | x | x | 1 | Transaction OK | Done | Transaction complete |

| | |
|---|---|
| Master: | If status_n[0] is 0 (destination module is not present) on the status cycle, the master may signal an error. |
| | If status_n[0] is 1 (transaction OK) on the status cycle, the master has no further responsibilities. |
| | A master may read from its own registers or those of other modules on the same board. A board or module should properly handle a read-partial response transaction in which it is both master and slave. Such an operation may use the R-Bus or be performed independent of the R-Bus. |
| Slave (requestor): | |
| | There is one slave, specified by dest_id_n[ ]. |
| | If the slave module is present, then it shall assert ack_n on the status cycle. The slave in a read-partial response must be ready and shall not assert not_ready_n on the status cycle. |
| | If the slave does not have an outstanding read request, then the slave may signal an error. |
| | If the slave does have an outstanding read request, then the slave shall clear its response time-out counter. |
| | If data_err_n is asserted on the data cycle, then the slave may or may not accept the data and may signal an error. |
| Snoopers: | Read-partial responses are not snooped. |

A.11 Read-Block Response

| | |
|---|---|
| Description: | Sends a block of data requested by a previous read-shared request, read-exclusive request, read-browse request, or read-exclusive-IO request. |
| | A read-block response contains 4 data cycles. Figure 1-5 shows the bus sequence. |
| | A read-block response may be issued by a memory module or by an intervening module that is supplying a clean block. (An intervening module responds with the write-snarf transaction if it is supplying a dirty block.) |
| Data Cycles: | The following table describes each data cycle: |

| Signals | Value | Meaning |
|---|---|---|
| data_addr_n[127:0] | data | 16 bytes of data. |
| src_id_n[6:0] | source | Master's slot ID and module ID. |
| dest_id_n[6:0] | dest. | Requester's slot ID and module ID. |
| cntrl_n[3] | 0 | data_err_n normally 0. 1 if the data contains errors, else 0. |
| cntrl_n[2] | 1,1,1,0 | more_data_n is 1 on all but last cycle when it is 0. |
| cntrl_n[1:0] | $01_2$ | data_valid_n is 1, addr_valid_n is 0. |

If B is the block address, then the first data cycle transfers the bytes at addresses B to B+15, the second data cycle transfers the bytes at addresses B+16 to B+31, and so on.

Status Cycles: There is one status cycle for each data cycle, valid four cycles after the data cycle. The following table lists the possible status results.

| status_n[ ] | | | | Meaning for read-block response | Master Reaction | Slave Reaction |
|---|---|---|---|---|---|---|
| 3 | 2 | 1 | 0 | | | |
| x | x | x | 0 | No acknowledgment, Error | Abort, error | Ignore |
| x | x | x | 1 | Transaction OK | Done | Transaction complete |

Master: If status_n[0] is 0 (destination module is not present) on any status cycle, the master may signal an error.

If status_n[0] is 1 (transaction OK) on all status cycles, the master has no further responsibilities.

The master shall transmit all data cycles in the transaction even if status_n[ ] indicates that the transaction is unsuccessful.

Slave (requestor):
There is one slave, specified by dest_id_n[ ].

If the slave module is present, then it shall assert ack_n on all status cycles. The slave in a read-block response must be ready and shall not assert not_ready_n on any status cycle.

If the slave does not have an outstanding read request, then the slave may signal an error.

If data_err_n is asserted on any data cycle, then the slave may or may not accept the data and may signal an error.

Snoopers: Read-block responses are not snooped.

A.12 Read-Retry Response

Description: Signals a requester to retry a read request, when the responder did not assert not_ready_n during the request's status cycle.

A read-retry response contains one address/command cycle, as shown in Figure 1-4.

A/C Cycle: The following table describes the address/command cycle:

| Signals | Value | Meaning |
|---|---|---|
| data_addr_n[127:46] | u | Undefined. |
| data_addr_n[45:42] | $1110_2$ | read-retry response command. |
| data_addr_n[41:0] | u | Undefined (commonly address of rejected request). |
| src_id_n[6:0] | source | Master's slot ID and module ID. |
| dest_id_n[6:0] | dest. | Requester's slot ID and module ID. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: There is one status cycle, valid four cycles after the data cycle. The following table lists the possible status results.

| status_n[ ] | | | | Meaning for read-partial response | Master Reaction | Slave Reaction |
|---|---|---|---|---|---|---|
| 3 | 2 | 1 | 0 | | | |
| x | x | x | 0 | No acknowledgment, Error | Abort, error | Ignore |
| x | x | x | 1 | Transaction OK | Done | Transaction complete |

Master: If status_n[0] is 0 (destination module is not present) on the status cycle, the master shall signal an error.

If status_n[0] is 1 (transaction OK), the master has no further responsibilities.

Slave (requestor):
There is one slave, specified by dest_id_n[ ].

If the slave module is present, then it shall assert ack_n on the status cycle. The slave in a read-partial response must be ready and shall not assert not_ready_n on the status cycle.

If the slave does not have an outstanding read request, then the slave may signal an error.

Snoopers: Read-retry responses are not snooped.

A.13 Invalidate

Description: Invalidates a block in snoopers' caches.

An invalidate transaction contains one address/command cycle, as shown in Figure 1-4.

A caching module uses an invalidate transaction to take a block from the shared state (the block may be in multiple caches) to the exclusive or dirty state (the block is only in this master's cache.)

A/C Cycle: The following table describes the address/command cycle:

| Signals | Value | Meaning |
|---|---|---|
| data_addr_n[127:46] | u | Undefined. |
| data_addr_n[45:42] | $1101_2$ | invalidate command. |
| data_addr_n[41:36] | u | Undefined. |
| data_addr_n[35:6] | addr | Address's most significant bits. |
| data_addr_n[5:0] | u | Undefined. |
| src_id_n[6:0] | source | Master's slot ID and module ID. |
| dest_id_n[6:0] | 0 | Undriven. |
| cntrl_n[3] | 0 | data_err_n is 0 if address is valid, and 1 if address is erroneous. |
| cntrl_n[2:0] | $010_2$ | data_valid_n is 0, addr_valid_n is 1, more_data_n is 0. |

Status Cycle: There is one status cycle, valid four cycles after the address/command cycle. The following table lists the possible status results.

| status_n 3 2 1 0 | Meaning for Invalidate | Master Reaction | Memory Slave Reaction | Snoopers Reaction (block is cached) |
|---|---|---|---|---|
| x x x 0 | No acknowledgment | Abort, may error | Ignore | May Ignore |
| x x 1 1 | Not ready | Retry later, keep retry count | Ignore | Likely Ignore May not change cache state. |
| 0 x 0 1 | Transaction OK. | Wait for response Keep response time-out | Ignore | If cached change to invalid state. |

Master:  Slaves: A slave shall assert ack_n on the status cycle if the slave contains a cacheable memory block at the specified address.

A slave shall not assert ack_n and shall not accept the block if the slave does not contain a cacheable memory block at the specified address. If the address falls in a range used for registers or non-cacheable memory, then the slave may signal an error.

A slave shall assert not_ready_n with ack_n in the status cycle if it is temporarily unable to participate in the invalidate transaction.

Snoopers: All caching modules on the R-Bus, shall snoop invalidate transactions or assert not_ready_n in the status cycle if temporarily unable to snoop or temporarily unable perform the required state change operation. A snooper shall not assert ack_n. Acknowledging the transaction is done by slave.

If the received transaction status is $xx11_2$ (slave or snooper is not ready), then snoopers shall take no action and the snooping shall not cause any change in the snooper's cache state.

If the received transaction status is $xx01_2$ (transaction OK) then snoopers shall invalidate the block if it is in their caches, discarding any cached copies.

Appendix B: Timing Diagrams
This Appendix provides timing diagrams for all R-Bus transactions.
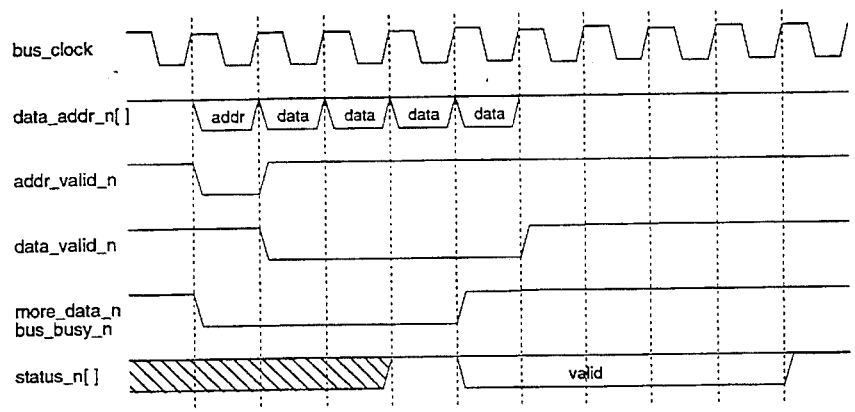
B.1  Write-Clobber, Write-No-Snoop, or Write-Snarf Transaction
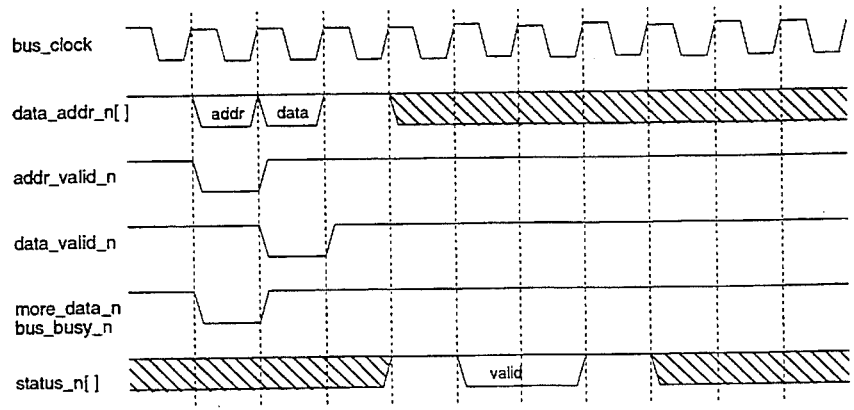
B.2  Write-Partial Transaction

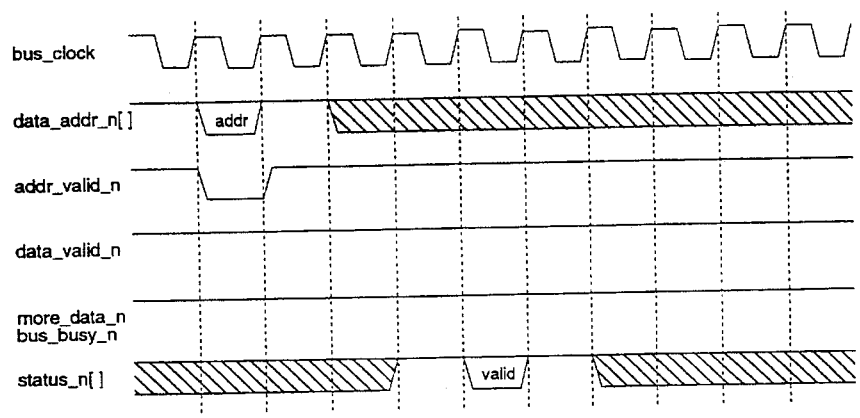
B.3   Read Request, Read-Retry Response, or Invalidate Transaction

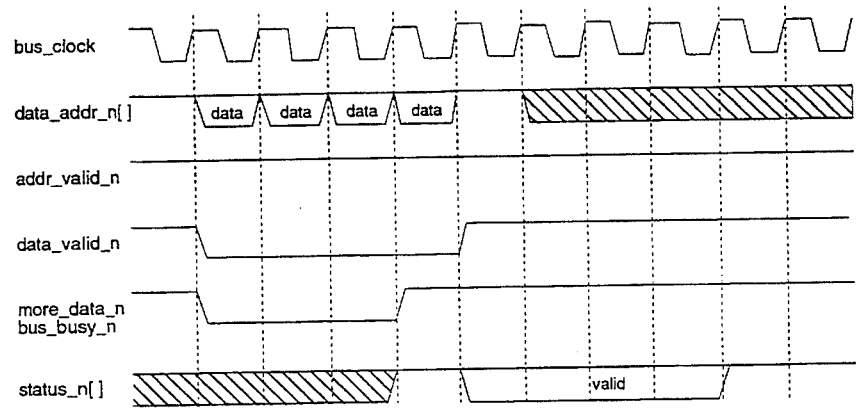
B.4 Read-Block Response Transaction
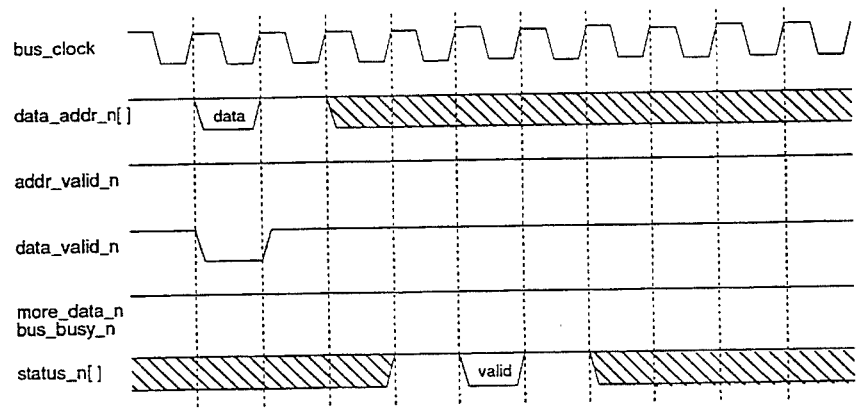
B.5 Read-Partial Response Transaction

What is claimed is:

1. In a computer having a plurality of modules connected by a backplane bus including a plurality of competition signal lines and a plurality of class signal lines, a method of arbitrating between said modules for access to the backplane bus to engage in one or more of a plurality of types of bus transactions, comprising the steps of:

classifying said bus transactions into different classes;

during each of a succession of competition cycles:

when a module wants access to the backplane bus to engage in a particular type of bus transaction, asserting a class signal line corresponding to a class in which said particular type of bus transaction has been classified;

based on information presented on said class signal lines, determining which modules are or are not eligible to compete for access to the backplane bus;

when a module is eligible to compete for access to the backplane bus, driving an identification code associated with the module on the competition signal lines; and based on information presented on said competition signal lines, granting a module access to the backplane bus.

2. The method of claim 1, wherein said backplane bus has a plurality of bus slots, and said identification code is a slot ID number of a bus slot in which a module is inserted.

3. The method of claim 2, wherein said granting step comprises granting access to the backplane bus to a module driving on the competition signal lines one of a highest slot ID number and a lowest slot ID number.

4. The method of claim 1, wherein said determining step comprises determining that a module granted access to the backplane bus to engage in a transaction of a particular class, in response to the module asserting a class signal line corresponding to said particular class, is not eligible to compete for access to the backplane bus for so long as any module asserts said class signal line corresponding to said particular class.

5. The method of claim 4, wherein said driving step comprises a module that has been repeatedly granted access to the backplane bus to engage in a transaction of a particular class, but that has been unable to successfully complete the transaction, driving an identification code associated with the module on the competition signal lines despite not being eligible to compete.

6. The method of claim 1, wherein said determining step comprises determining that only modules wanting access to the backplane bus to engage in one or more particular classes of bus transactions are eligible to compete, based on information presented on said class signal lines and on which one or more particular classes of bus transactions modules eligible to compete during a preceding competition cycle wanted to engage in.

7. The method of claim 6, wherein said classes include a response class and at least one request class and said class signal lines include a response class signal line and at least one request class signal line, and wherein said determining step comprises determining, when said response class signal line is asserted and when competition during a previous competition cycle was not limited to modules wanting to engage in transactions of the response class, that only modules wanting access to the backplane bus to engage in transactions of the response class are eligible to compete.

8. The method of claim 7, wherein said classes include a response class and at least one request class and said class signal lines include a response class signal line and at least one request class signal line, and wherein said determining step comprises determining, when said response class signal line is asserted and when competition during a previous competition cycle was limited to modules wanting to engage in transactions of the response class, that only modules wanting access to the backplane bus to engage in transactions of the request class are eligible to compete.

9. The method of claim 8, wherein said classes include a low priority request class and a high priority request class and said class signal lines include a low priority request class signal line and a high priority request class signal line, and wherein said determining step comprises determining, when said low priority request class signal line and said high priority request class signal line only are asserted, that only modules wanting access to the backplane bus to engage in transactions of the high priority request class are eligible to compete.

10. The method of claim 6, wherein said classes include a low priority request class and a high priority request class and said class signal lines include a low priority request class signal line and a high priority request class signal line, and wherein said determining step comprises determining, when said low priority request class signal line and said high priority request class signal line are asserted, that only modules wanting access to the backplane bus to engage in transactions of the high priority request class are eligible to compete.

11. The method of claim 1, further comprising a bus busy signal line and further comprising the step of a module having been granted access to the backplane bus asserting said bus busy signal, wherein said competition cycles are suspended while said bus busy signal line is asserted.

12. The method of claim 11, further comprising a bus inherit signal line, wherein the module granted access to the backplane bus becomes the bus master and engages in said bus transaction with another bus module that becomes the bus slave for purposes of said bus transaction, said method comprising the further step of said bus slave asserting said bus inherit signal line, wherein said competition cycles are suspended while said bus busy signal line is asserted.

13. The method of claim 12, comprising the further step of said bus slave accessing the backplane bus as part of said bus transaction without any intervening transaction.

* * * * *